(12) United States Patent
Jameson

(10) Patent No.: US 7,003,759 B2
(45) Date of Patent: Feb. 21, 2006

(54) COLLECTION MAKEFILE GENERATOR

(75) Inventor: Kevin Wade Jameson, Calgary (CA)

(73) Assignee: Codefast, Inc., San Jose, CA (US)

( * ) Notice: Subject to any disclaimer, the term of this patent is extended or adjusted under 35 U.S.C. 154(b) by 593 days.

(21) Appl. No.: 09/885,077

(22) Filed: Jun. 21, 2001

(65) Prior Publication Data

US 2002/0199170 A1    Dec. 26, 2002

(51) Int. Cl.
*G06F 9/44* (2006.01)
(52) U.S. Cl. .................................................. 717/120
(58) Field of Classification Search ........ 717/147–149, 717/101, 120; 719/310, 328
See application file for complete search history.

(56) References Cited

U.S. PATENT DOCUMENTS 6,032,198 A * 2/2000 Fujii et al. ................ 719/328

2002/0147855 A1 * 10/2002 Lu ............................ 709/310

* cited by examiner

*Primary Examiner*—Kakali Chaki
*Assistant Examiner*—Trenton J. Roche
(74) *Attorney, Agent, or Firm*—Van Pelt, Yi & James LLP

(57) ABSTRACT

Collection makefile generators generate comprehensive makefiles for processing collections of computer files. In operation, the present collection makefile generator dynamically discovers collection content files, classifies them according to content type and required processing actions, and then generates a makefile for performing those actions. Importantly, all build order dependencies are properly maintained among multiple collection products and among individual collection content files. Automated collection makefile generators drastically improve the productivity of human workers by effectively reducing makefile creation and maintenance costs to zero. Collection makefile generators thus enable humans to easily generate complex makefiles in an automated, scalable way that was not previously possible.

27 Claims, 41 Drawing Sheets

FIG. 1
PRIOR ART
| | |
|---|---|
| 1 | c:\collections |
| 2 | notes.txt |
| 3 | myletter.doc |
| 4 | c-myhomepage |
| 5 | |
| 6 | s |
| 7 | homepage.html |
| 8 | myphoto.jpg |
FIG. 2
| | |
|---|---|
| 1 | c:\collections |
| 2 | notes.txt |
| 3 | myletter.doc |
| 4 | c-myhomepage |
| 5 | cspec |
| 6 | s |
| 7 | homepage.html |
| 8 | myphoto.jpg |
FIG. 3
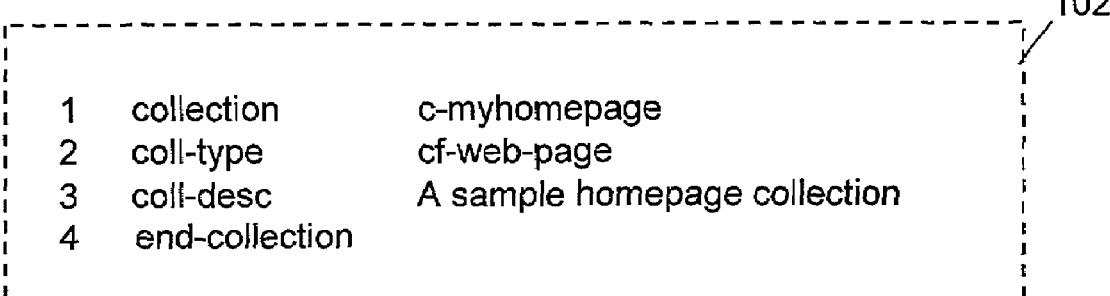
| | | |
|---|---|---|
| 1 | collection | c-myhomepage |
| 2 | coll-type | cf-web-page |
| 3 | coll-desc | A sample homepage collection |
| 4 | end-collection | |

FIG. 8

```
1   /* collection data structure */
2   collection-info {

3     + specifier_info
4         + coll-type-indicator
5         + other specifier information ...

6     + content_info
7         + content_location_info ...
8         + content_members ...
9         + other content information...

10    + other collection structure information...
11  }
```

FIG. 9

```
1   /* collection type definition data structure */
2   collection-type-definition-info {

3     + coll-type-name
4     + collection internal structure info ...
5     + collection content location info ...
6     + collection content type recognition info ...

7     + other collection type definition information...
8   }
```

FIG. 10

| | KEY | VALUE | |
|---|---|---|---|
| 1 | /* collection type internal structure definitions */ | | |
| 2 | dir_source_files | ./s | |
| 3 | dir_doc_files | ./doc | |
| | | | |
| 4 | /* content location definitions (per-type content links) */ | | |
| 5 | content_subtree_http | http://host.com/some/dir/name | |
| 6 | content_subtree_ftp | ftp://host.com/some/dir/name | |
| 7 | content_subtree_nfs | /some/local/directory/name | |
| | | | |
| 8 | /* content type recognition definitions */ | | |
| 9 | content_policy | subtree_below_cspec_file | |
| 10 | content_file_type | .c | file_cpp |
| 11 | content_file_type | .c | file_c |
| 12 | content_file_type | .h | file_c_include |
| 13 | content_file_type | .doc | file_ms_word |
| 14 | content_file_type | .html | file_html |
| 15 | content_file_type | .xls | file_ms_excel |
| | | | |
| 16 | /* collection processing definitions */ | | |
| 17 | compile_c_files | yes | |
| 18 | compiler_windows | vc++ | |
| 19 | compiler_unix | gcc | |
| 20 | build platforms | Win98, Win2000, gnulinux | |
| 21 | process files | compile link | |
| 22 | link libraries | stdio math sock | |
| | | | |
| 23 | /* results dispatching definitions */ | | |
| 24 | results_ftp_host | ftp.output.com | |
| 25 | results_ftp_dir | c:\ftphome\collection\results | |

1  /* simplified algorithm for collection makefile generator */
2  Call get runtime info to get invocation parameters
3  Call collection content classifier to classify collection content
4  Call collection makefile generator manager to generate
   a complete makefile, passing classifier information as input

FIG. 13

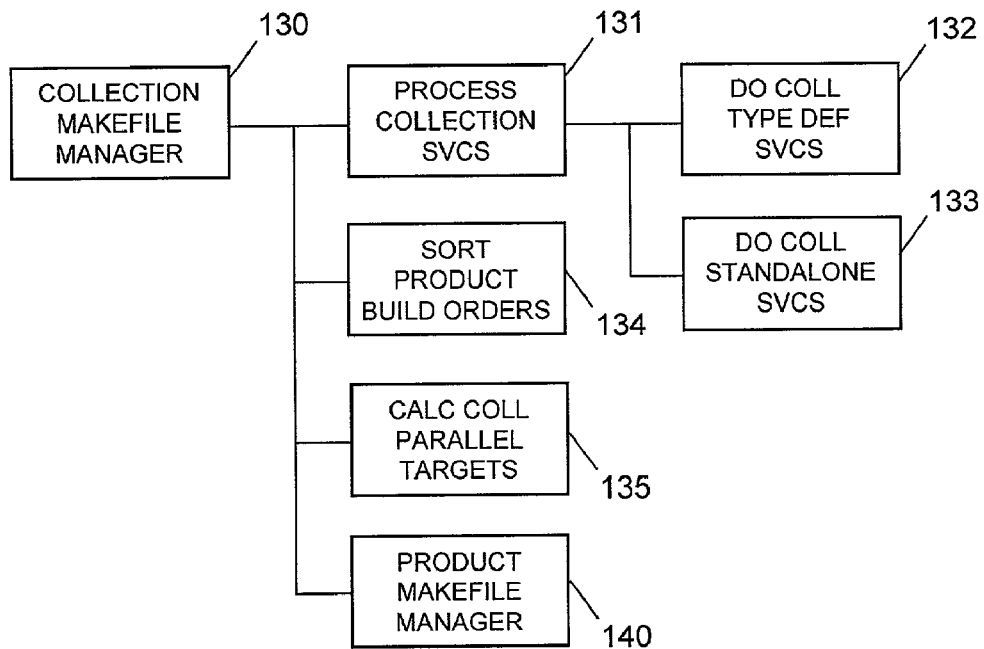

FIG. 14

```
1   /* simplified algorithm for collection makefile manager */
2   Process collection-level fragments
3       Process fragments from collection type definition
4       Process fragments from collection specifier
5   Determine relative build order among multiple products
6   Determine number, names of coll-level parallel build targets
7   Loop over each product in collection
8       Process each product by calling product makefile manager
```

FIG. 15

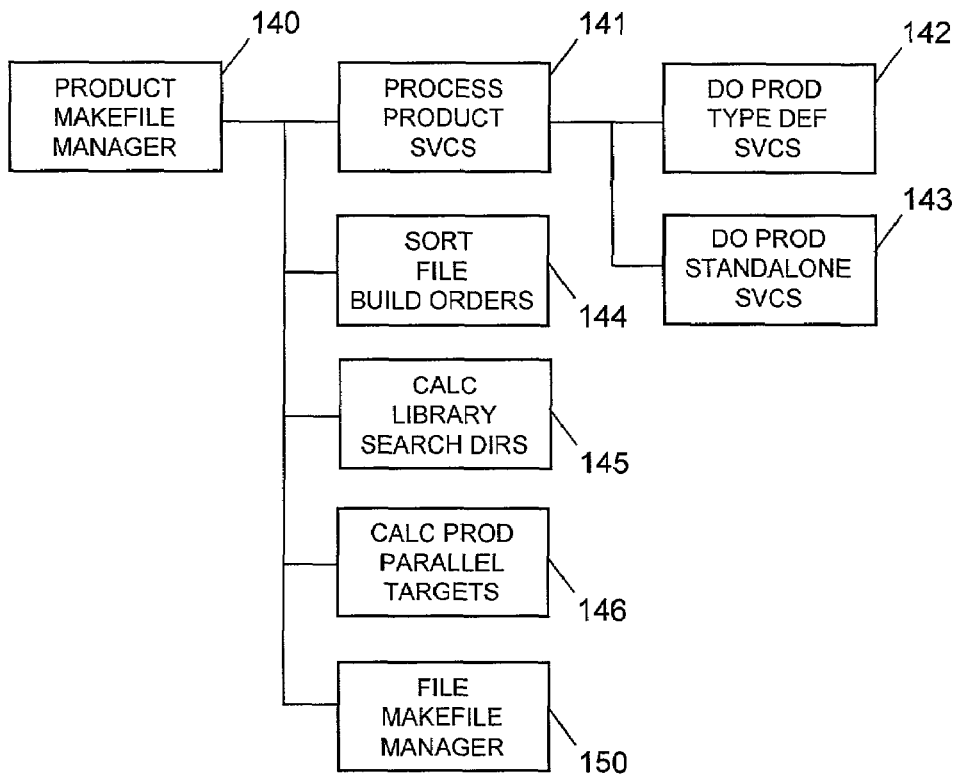

FIG. 16

```
1   /* simplified algorithm for processing one product */
2   Process product-level fragments
3       Process fragments from product type definition
4       Process fragments from product section of collection specifier
5   Determine relative build order among content files for product
6   Determine number, names of product-level parallel build targets
7   Loop over each content file
8       Process each content file by calling file makefile manager
```

1  /* simplified algorithm for processing one content file */
2  Calculate include file search directories
3  Process fragments from content type definition
4  Process fragments from action type definition

```
1   /* simplified algorithm for processing one fragment */
2   Substitute replacement values for placeholder strings
3   Insert substituted fragment into makefile data structure
```

FIG. 21

```
1    c:\collections
2       c-my-example
3          cspec
4          s
5             pi
6                cmdline.h
7             win98
8                cmdline.c
9             gnulinux2
10               cmdline.c
11         lib
12            pi
13               libfuns.h
14               libfuns.c
```

FIG. 22

```
1    cspec:

2    collection   c-my-example
3    coll-type    ct-program
4    coll-desc    A multi-platform C program with library.
5    end-collection 6    product      myprog
7    prod-type    pt-program
8    prod-desc    A program product.
9    libs         team-lib gnulinux-lib
10   end-product 11   product      mylibrary
12   prod-type    pt-library
13   prod-desc    A library product.
14   end-product
```

FIG. 23

```
1    /* classification output for gnulinux2 platform */
2    collection            c-my-example
3    coll-type             ct-program
4    ... other coll classification info 5    /* classification info for a program product */
6    product               myprog
7    prod-type             pt-program 8    content               cmdline.h
9    content-path          ../s/pi/cmdline.h
10   content-type          ctype-c-header
11   content-language      c
12   end-content 13   content               cmdline.c
14   content-path          ../s/gnulinux2/cmdline.c
15   content-type          ctype-c-source
16   content-language      c
17   content-dep           ../s/pi/cmdline.h
18   content-dep           ../lib/pi/libfuns.h
19   content-dep           external-incl-file.h
20   content-dep           team-incl.h
21   end-content 22   end-product
```

FIG. 24

```
1    /* classification output */
2    collection            c-my-example

3    ... /* classification info for the host collection */
4    ... /* classification info for the program product */

5    /* classification info for a library product */
6    product               mylibrary
7    prod-type             pt-library 10   content               libfuns.h
11   content-path          ../lib/pi/libfuns.h
12   content-type          ctype-c-header
13   content-language      c
15   end-content 16   content               libfuns.c
17   content-path          ../lib/pi/cmdline.c
18   content-type          ctype-c-source
19   content-language      c
21   content-dep           ../lib/pi/libfuns.h
22   end-content 23   end-product
```

FIG. 25

1     collection type definition information
2       product type definition information
3          content type definition information
4            action type definition information 5    cspec:
6    coll-type            ct-program 7    index-coll-types.tbl:
8    ct-program           ct-program.def
9    ct-web-page         ct-web-page.def 10   ct-program.def:
11   product-type-index    index-product-types.tbl 12   index-product-types.tbl:
13   pt-program           pt-program.def 14   pt-program.def:
15   content-type-index    index-content-types.tbl 16   index-content-types.tbl
17   ctype-c-source       content-c.def 18   content-c.def:
19   action-type-index     index-action-types.tbl 20   index-action-types.def:
21   action-c-source       action-c-source.def 22   action-c-source.def:
23   ... action definition information

FIG. 26

```
1   index-coll-types.tbl:
2   ct-program              ct-program.def
3   ct-library              ct-library.def
4   ct-doc-html             ct-html.def 5   ct-program.def:
6   /* type definition info for a "ct-program" collection type */
7   product-type-index      index-prod-program.tbl 8   base-template           base-template.tpl 9   service                 svc-coll-macro-platform
10  service                 svc-coll-macro-site
11  service                 svc-coll-macro-tool-names
12  service                 svc-coll-macro-compiler
13  service                 svc-coll-macro-suffix
14  service                 svc-coll-target-defaults
15  service                 svc-coll-target-others 16  parallelism-max         4

17  ... other collection type info
```

FIG. 27

```
1   index-prod-program.tbl:
2   pt-program              pt-program.def
3   pt-program-java         pt-program-java.def
4   pt-program-unix         pt-program-unix.def
5   pt-program-win          pt-program-win.def 6   pt-program.def:
7   /* type definition info for a "program" product type */
8   dir-source-files        dirs-source.lst
9   dir-library-files       dirs-library.lst
10  dir-include-files       dirs-include.lst
11  file-identification-table   file-identification.tbl
12  content-type-index      index-content-types.tbl
13  service                 svc-prod-program
14  ... other product type info
```

FIG. 28

```
1   index-content-types.tbl:
2   ctype-c-source              content-c.def
3   ctype-c-header              content-c-h.def
4   ctype-csh                   content-csh.def
5   ctype-html                  content-html.def 6   content-c.def:
7   /* type definition info for a "c" file type */
8   type                        c-source
9   language                    c
10  action                      action-c-source
11  action-type-index           index-action-types.tbl
12  service                     svc-file-c-source
13  ... other content type definition info
```

FIG. 29

```
1   index-action-types.tbl:
2   action-c-source             action-c-source.def
3   action-c-header             action-c-header.def
4   action-csh                  action-csh.def
5   action-html                 action-html.def 6   action-c-source.def:
7   parser-type                 internal
8   parser-name                 internal-c
9   service                     svc-action-c-source
```

FIG. 30

```
1    idx-makefile-services.tbl:

2    /* services for collections */
3    svc-coll-macro-platform      coll-macro-platform.tpl
4    svc-coll-macro-site          coll-macro-site.tpl
5    svc-coll-macro-compiler      coll-macro-compiler.tpl
6    svc-coll-macro-toolnames     coll-macro-toolnames.tpl
7    svc-coll-macro-file-suffix   coll-macro-file-suffix.tpl
8    svc-coll-target-defaults     coll-target-defaults.tpl
9    ...
10   /* services for products */
11   svc-prod-program             prod_prog_pi.tpl
12   svc-prod-program             prod_prog_os.tpl
13   svc-prod-program             prod_prog_pd.tpl
14   ...
15   svc-prod-library             prod-lib-pi.tpl
16   svc-prod-library             prod-lib-os.tpl
17   svc-prod-library             prod-lib-pd.tpl
18   ...
19   /* services for files */
20   svc-file-c-source            file-c.tpl
21   svc-file-c-header            file-c-header.tpl
22   svc-file-f90                 file-f90.tpl
23   svc-file-f90-header          file-f90-header.tpl
24   svc-file-f90-module          file-f90-module.tpl
25   ...
26   /* services for actions */
27   svc-action-c-source          action-c-source.tpl
28   ...
29   /* services for application tasks */
30   svc-app-chmod                app-chmod.tpl
31   svc-app-copy-file            app-copy-file.tpl
32   ...
```

FIG. 31

```
1    coll-macro-platform.tpl:
2    # This file defines platform-specific makefile macros
3
4    fragment-begin
5    _marker_ marker-htree copy
6    # The holding area for shared files and libraries
7    HTREE=/site/h
8    fragment-end
9
10   fragment-begin
11   _marker_ marker-macros1 copy
12   # makefile platform name, virtual platform name
13   MP=win98.plt
14   VP=win98
15   fragment-end
```

FIG. 32

```
1    coll-macro-site.tpl:
2    # This file defines site-specific makefile macros
3    fragment-begin
4    _marker_ marker-macros1 copy
5
6    # places where shared files go
7    SHARE_DIR=$(HTREE)\share
8
9    # places where web pages go
10   HOST_WEB=www.your_domain.com
11   ...
12   fragment-end
```

FIG. 33

```
1   coll-macro-toolnames.tpl:
2   # define macros for various program names
3   fragment-begin
4   _marker_ marker-macros1 copy
5
6   LS=ls
7   DIR=dir
8   RM=rm
9   CP=cp
10  ZIP=zip
11  UNZIP=unzip
12  CC=gcc
13  LIB=ld
14  RMDIR=rm
15  fragment-end
```

FIG. 34

```
1   coll-macro-compiler.tpl:
2   # This file defines compiler options
3   fragment-begin
4   _marker_ marker-macros1 copy
5
6   # default compiler options
7   OPT=
8   DEBUG=
9   # default linker options
10  LIBSPATH = $(HTREE)/$(MP)
11  LDFLAGS= -s
12  LPP= -L
13
14  fragment-end
```

FIG. 35

```
1   coll-macro-suffix.tpl:
2   # defines macros for file suffixes for this platform
3   fragment-begin
4   _marker_ marker-macros1 copy
5
6   # objects, executables, libraries, archives
7   O=.o
8   SO=.so
9   X=
10  L=.a
11  A=
12  AWKS=.awk
13  SEDS=.sed
14  LEXS=.l
15  YACS=.y
16  CLASS=.class
17  fragment-end
```

FIG. 36

```
1   coll-target-defaults.tpl:
2   # This file defines default makefile targets
3   fragment-begin
4   _marker_ marker-targets0 copy
5
6   # default targets used by all makefiles
7   default: build
8
9   all: build exports
10
11  build:
12
13  exports:
14  fragment-end
```

FIG. 37

```
0   /* fragment commands */
1   fragment-begin / fragment-end
2   _marker_    marker-name    copy
3   _macro_     macro-name     append      value1 value2...
4   _target_    target-name    add-deps    dep1 dep2 ...
5   _target_    target-name    copy
6   _target_    target-name    copy-force
```

FIG. 38

```
1   base-template.tpl:
2
3   # marker-htree
4
5   # marker-macros1
6
7   # marker-targets0
```

FIG. 39

```
1    makefile.out:
2
3    # The holding area for shared files and libraries
4    HTREE=/site/h
5    # marker-htree
6
7    # makefile platform name, virtual platform name
8    MP=win98.plt
9    VP=win98
10
11   # places where shared files go
12   SHARE_DIR=$(HTREE)\share
13   ...
14   LS=ls
15   DIR=dir
16   ...
17   OPT=
18   DEBUG=
19   ...
20   O=.o
21   SO=.so
22   X=
23   ...
24   # marker-macros1
25
26   # default targets used by all makefiles
27   default: build
28
29   all: build exports
30
31   build:
32
33   exports:
34   # marker-targets0
```

FIG. 40

```
1   prod-prog-pi.tpl:
2   # Define platform-independent macros for programs
3
4   fragment-begin
5   _marker_ marker-macros1 copy
6   # Initialize these macros so they are defined.
7   ALL_OBJS__prod_=
8   OBJ_PI__prod_=
9   OBJ_F90__prod_=
10  OBJ_F90_MOD__prod_=
11
12  # create one macro to hold all objects
13  ALL_OBJS__prod_=$(OBJ_PI__prod_) \
14      $(OBJ_F90__prod_) $(OBJ_F90_MOD_prod_)
15
16  # add marker to anchor linker  macro later
17  # marker-link-cmd
18  fragment-end
```

FIG. 41

```
1   prod-prog-os.tpl:
2   # Define operating system macros for programs
3
4   # Adds program name dependency to build target.
5   fragment-begin
6   _target_ build        add_deps _mprod_$(X)
7   fragment-end
8
9   # Adds program name dependency to export target
10  fragment-begin
11  _target_ exports      add_deps _mprod_$(X)
12  fragment-end
```

FIG. 42

```
1   prod-prog-pd.tpl:
2   # Define platform-dependent macros for programs
3
4   fragment-begin
5   _marker_ marker-macros1 copy
6   # default compiler flags for this platform
7   CCFLAGS1= -Wall -ansi -pipe -I.
8   CCFLAGS2= -I- -c
9   fragment-end
10
11  fragment-begin
12  _marker_ marker-link-cmd copy
13  # linker command for this platform
14  LDLIBS=
15  LD__prod_=${CC} -o _mprod_  _lib_dirs_ \
16            $(ALL_OBJS__prod_) _lib_names_
17  fragment-end
18
19  fragment-begin
20  # add link command to target for program product
21  _target_ _mprod_$(X)  copy
22      $(LD__prod_) $(LDFLAGS)
23      $(CHMOD) 775 _mprod_$(X)
24  fragment-end
25
26  fragment-begin
27  # add object dependencies to product target
28  _target_ _mprod_$(X) add_deps $(OBJ_PI__prod_)
29  fragment-end
```

FIG. 43

| | | |
|---|---|---|
| 1 | _prod_ | name of product from cspec |
| 2 | _mprod_ | name of product file on disk |
| 3 | _ptype_ | product type of current product |
| 4 | _src_file_path_ | source file pathname |
| 5 | _src_file_name_ | source file filename |
| 6 | _src_file_name_no_suf_ | source filename with no suffix |
| 7 | _target_list_ | list of makefile targets |
| 8 | _target_name_ | name of current target |
| 9 | _deplist_ | list of dependent targets |
| 10 | _incl_dirs_ | list of include directories |
| 11 | _lib_dirs_ | list of library directories |
| 12 | _lib_names_ | list of library names |
| 13 | _zpln_ | parallel target number 01,02,etc |

FIG. 44

```
1    makefile.out:
2    ...
3    # Initialize these macros so they are defined.
4    ALL_OBJS_myprog=
5    OBJ_PI_myprog=
6    OBJ_F90_myprog=
7    OBJ_F90_MOD_myprog=
8
9    # create one macro to hold all objects
10   ALL_OBJS_myprog=$(OBJ_PI_myprog) \
11       $(OBJ_F90_myprog) $(OBJ_F90_MOD_myprog)
12
13   # marker-link-cmd
14
15   # marker-macros1
16
17   # default targets used by all makefiles
18   default: build
19
20   all: build exports
21
22   build: myprog
23
24   exports: myprog
25   # marker-targets0
```

FIG. 45

```
1    makefile.out:
2    ...
3    # Initialize these macros so they are defined.
4    ALL_OBJS_myprog=
5    OBJ_PI_myprog=
6    ...
7    # create one macro to hold all objects
8    ALL_OBJS_myprog=$(OBJ_PI_myprog) ...
9    ...
10   # linker command for this platform
11   LDLIBS=
12   LD_myprog=${CC} -o myprog  $(LDLIBS) \
13           $(ALL_OBJS_myprog) $(lb)
14   # marker-link-cmd
15   ...
16   # default compiler flags for this platform
17   CCFLAGS1= -Wall -ansi -pipe -I.
18   CCFLAGS2= -I- -c
19   # marker-macros1
20   ...
21   build: myprog
22
23   exports:  myprog
24   ...
25   # add link command to target for program product
26   myprog:  $(OBJ_PI_myprog)
27        $(LD_myprog) $(LDFLAGS)
28        $(CHMOD) 775 myprog
29   # marker-targets0
```

FIG. 46

```
1    file-c-source.tpl:
2    # process files
3
4    # add current source file to top src file macro
5    fragment-begin
6      _macro_ SRC_C           append _src_file_path_
7    fragment-end
8
9    # add current source file to product source file macro
10   fragment-begin
11     _macro_ SRC_C__prod_   append _src_file_path_
12   fragment-end
```

FIG. 47

```
1    action-c-source.tpl:
2    # process files
3
4    # add compilation command under C object targets.
5    fragment-begin
6      _target_ _target_name_$(O) copy
7         $(CC) $(OPT) $(DEBUG) $(CCFLAGS1) \
8             _incl_dirs_ $(CCFLAGS2) _src_file_path_
9    fragment-end
10
11   # add dependency list to C object target.
12   fragment-begin
13     _target_ _target_name_$(O)   add_deps _deplist_
14   fragment-end
```

FIG. 48

```
1   makefile.out:
2   ...
3   SRC_C= ../s/gnulinux2/cmdline.c ...
4   ...
5   SRC_C_prod_= ../s/gnulinux2/cmdline.c ...
6   ...
7   # default compiler flags for this platform
8   CCFLAGS1= -Wall -ansi -pipe -I.
9   CCFLAGS2= -I- -c
10  # marker-macros1
11  ...
12  # default targets used by all makefiles
13  default: build
14
15  all: build exports
16
17  build: myprog
18
19  exports: myprog
20  ...
21  cmdline.o: ../s/pi/cmdline.h ../lib/pi/libfuns.h
22      $(CC) $(OPT) $(DEBUG) $(CCFLAGS1) \
23          _incl_dirs_ $(CCFLAGS2) ../s/gnulinux2/cmdline.c
24
25  ...
26  # marker-targets0
```

FIG. 49

| 1 | collection | c-my-example |
| 2 | coll-type | ct-program |
| 3 | coll-desc | A fileset example |
| 4 | svc | svc-coll-cleanup |
| 5 | end-collection | |
| 6 | product | myprog |
| 7 | prod-type | pt-program |
| 8 | libs | mylib |
| 9 | svc | svc-app-copy-file  myprog myprog.bak |
| 10 | end-product | |

FIG. 50

```
1   cspec:
2   ...

3   product      myprog
4   prod-type    pt-program
5   prod-desc    A normal program binary executable.
6   end-product 7   product      myprog-2
8   prod-type    pt-shared-object
9   prod-desc    A shared object program executable
10  replace-name myprog
11  end-product 12  _prod_    becomes cspec    name    myprog-so
13  _mprod_   becomes diskfile name    myprog 14  # add link command to target for program product
15  _mprod_$(X):
16      $(LD__prod_) $(LDFLAGS_prod_)
17      $(CHMOD) 775 _mprod_$(X)

18  # link target for product myprog
19  myprog$(X):
20      $(LD_myprog) $(LDFLAGS_myprog)
21      $(CHMOD) 775 myprog$(X)

22  # link target for product myprog-so
23  myprog$(SO):
24      $(LD_myprog-2) $(LDFLAGS_myprog-2)
25      $(CHMOD) 775 myprog$(SO)
```

FIG. 51

```
1   product-build-order.tbl:
2   # define relative build order among products
3
4   pt-initial        10
5   pt-data           50
6   pt-library        100
7   pt-program        1000
8   pt-script         1000
```

FIG. 52

```
1   makefile.out:
2   ...
3   # dependent targets mylib and myprog appear in proper
4   # product build order, from left to right
5   #
6   build: mylib myprog
7
8   mylib:
9   ...
10  myprog:
11  ...
```

FIG. 53

```
1   file-build-order.tbl:
2   # define relative build order among file types
3
4   ft-resource           10
5   ft-precompiled-cpp    20
6   ft-c-source           50
```

FIG. 54

```
1   makefile.out:
2   ...
3   # dependent targets mylib and myprog appear in proper
4   # product build order, from left to right
5   #
6   build: mylib myprog
7
8   mylib:
9   ...
10  myprog: myresource.rc myprecompiled-header.o cmdline.o
11  ...
```

FIG. 55

1     dirs-include.lst:

2     dir/gnulinux2          /site/myteam/include/gnulinux2
3     dir/gnulinux2          /site/myteam/include/gnulinux
4     dir/gnulinux2          /site/include/gnulinux2
5     dir/gnulinux2          /site/include/gnulinux

FIG. 56

1     # suppose these are paths to example include files
2     /site/include/gnulinux2/external-incl-file.h
3     /site/myteam/include/gnulinux/team-incl.h 4     # include files matched by search rules, in order
5     /site/myteam/include/gnulinux/team-incl.h
6     /site/include/gnulinux2/external-incl-file.h 7     _incl_dirs_ = -I /site/myteam/include/gnulinux \
            ... -I /site/include/inux2

8     makefile.out:
9     ...
10    file1.o: ../s/file1.c
11       $(CC) $(OPT) $(DEBUG) $(CCFLAGS1) \
12       -I /site/myteam/include/gnulinux -I /site/include/inux2 \
13       $(CCFLAGS2) ../s/file1.c

FIG. 57

1     dirs-library.lst:

2     dir/gnulinux2          /site/myteam/lib/gnulinux2
3     dir/gnulinux2          /site/myteam/lib/gnulinux
4     dir/gnulinux2          /site/lib/gnulinux2
5     dir/gnulinux2          /site/lib/gnulinux

FIG. 58

```
1    # suppose these are paths to example libraries
2    /site/lib/gnulinux2/gnulinux-lib.a
3    /site/myteam/lib/gnulinux/team-lib.a 4    # libs matched by search rules, in order
5    /site/myteam/lib/gnulinux/team-lib.a
6    /site/lib/gnulinux2/gnulinux-lib.a 7    _lib_dirs = -L /site/myteam/lib/gnulinux -L /site/lib/inux2
8    _lib_names_ = -l team-lib.a  gnulinux-lib.a 9    makefile.out:
10   ...
11   LD_mprog = $(LD)  -L /site/myteam/lib/gnulinux \
12             ... -L /site/lib/gnulinux2 \
13             ... -l team-lib.a -l gnulinux-lib.a
14   ...
15   myprog$(X): ...
16         $(LD_mprog) ...
```

FIG. 59

| | | Specific | Generic | Family | Every |
|---|---|---|---|---|---|
| 1 | virtual-platform.tbl: | | | | |
| 2 | # | | | | |
| 3 | # | Specific | Generic | Family | Every |
| 4 | # Name | OS | OS | OS | OS |
| 5 | # | | | | |
| 6 | gnulinux2.plt | gnulinux2 | gnulinux | unix | pi |
| 7 | sol28.plt | sol28 | sol | unix | pi |
| 8 | win98.plt | win98 | win9 | win | pi |
| 9 | win95.plt | win95 | win9 | win | pi |
| 10 | winnt40.plt | winnt40 | winnt | win | pi |
| 11 | win2000.plt | win2000 | winnt | win | pi |

FIG. 60

1 # fragment search directories for win98 platform
2 fragments/win98
3 fragments/win9
4 fragments/win
5 fragments/pi 6 # fragment search directories for gnulinux 2 platform
7 fragments/gnulinux2
8 fragments/gnulinux
9 fragments/unix
10 fragments/pi

FIG. 61

| 1 | collection | c-my-example | |
| 2 | coll-type | ct-program | |
| 3 | coll-desc | A fileset example | |
| 4 | end-collection | | |
| 5 | product | myprog | |
| 6 | prod-type | pt-program | |
| 7 | libs/pi | mylib | |
| 8 | libs/gnulinux | mylib myother-gnulinux-lib | |
| 9 | svc/pi | svc-prod-name | svc arguments |
| 10 | svc/gnulinux | svc-prod-name | svc args |
| 11 | svc/win98 | svc-prod-name | svc args |
| 12 | end-product | | |

FIG. 62

```
1    makefile.out
2    ...
3    myprog: file-001.o file-002.o ... file-100.o
4        $(LD_mprog) ...

5    # GNU make parallelism with –jobs argument will compile
6    # 4 files at a time to build the myprog target
7    #
8    make –j 4 myprog 9    # without a parallel make tool, makefile targets must be
10   # generated to offer parallelism, as follows:
11   #
12   myprog:  myprog-01 myprog-02 myprog-03 myprog-04
13   myprog-01: file-001.o file-002.o ...  file-025.o
14   myprog-02: file-026.o file-027.o ...  file-050.o
15   myprog-03: file-051.o file-052.o ...  file-075.o
16   myprog-04: file-076.o file-077.o ...  file-100.o 17   # now parallel commands can be issued against parallel targets
18   # running on multiple machines
19   on machine1:   make myprog-01
20   on machine2:   make myprog-02
21   ...
22   # running multiple windows on one machine
23   in shell window 1: make myprog-01
24   in shell window 2: make myprog-02
25   ...
26   # or running in the background on one machine
27   in shell window 1: make myprog-01 &
28   in shell window 1: make myprog-02 &
29   ...
```

FIG. 63

```
1   action-c-source.tpl:
2   # process files
3   ...
4   # this line adds the parallelism-specific object file macro to the
5   # "master" or "top level" object file macro.
6   fragment-begin
7   _macro_ OBJ_PI__prod_ append $(OBJ_PI__prod___zpln_)
8   fragment-end
9
10  # this line adds current object file to correct
11  # parallelism-specific object file macro
12  fragment-begin
13  _macro_ OBJ_PI__prod___zpln_ append _target_name_$(O)
14  fragment-end
15
16  # this line adds the parallelism-specific object file macro as a
17  # dependency of the parallelism-specific build target.
18  fragment-begin
19  _target_ build__zpln_ add_deps $(OBJ_PI__prod___zpln_)
20  fragment-end
```

FIG. 64

```
1   makefile.out:
2   ...
3   OBJ_PI_myprog     = file-001.o file-002.o ... file-100.o
4   OBJ_PI_myprog_01  = file-001.o file-002.o ... file-025.o
5   OBJ_PI_myprog_02  = file-026.o file-027.o ... file-050.o
6   ...
7   build_01: $(OBJ_PI_myprog_01)
8   ...
9   build_02: $(OBJ_PI_myprog_02)
10  ...
```

FIG. 65

```
1   makefile.out:
2   # sequential and parallel targets for multiple products
3   ...
4   # target for building all products sequentially
5   build: build_01 build_02 build_03
6   ...
7   # parallel targets for building all products in parallel
8   build_01:  myprog-01 product2-01 product3-01 ...
9   build_02:  myprog-02 product2-02 product3-02 ...
10  ...
11  # target for building product 'myprog' sequentially
12  myprog:  myprog-01 myprog-02 myprog-03
13  ...
14  # parallel targets for building product 'myprog' in parallel
15  myprog-01: $(OBJ_PI_myprog_01)
16  myprog-02: $(OBJ_PI_myprog_02)
17  ...
18  # target for building product 'product2' sequentially
19  product2: product2-01 product2-02 ...
20  ...
21  # parallel targets for building product 'product2' in parallel
22  product2-01:   $(OBJ_PI_product2_01)
23  product2-02:   $(OBJ_PI_product2_02)
24  ...
```

COLLECTION MAKEFILE GENERATOR

CROSS REFERENCES TO RELATED APPLICATIONS

The present invention uses inventions from the following patent applications that are filed contemporaneously herewith, and which are incorporated herein by reference:

US PTO Ser. No. 09/885,078 Collection Information Manager; Kevin Jameson.

US PTO Ser. No. 09/885,076 Collection Content Classifier; Kevin Jameson.

FIELD OF THE INVENTION

This invention relates to automated software systems for processing collections of computer files in arbitrary ways, thereby improving the productivity of software developers, web media developers, and other humans and computer systems that work with collections of computer files.

BACKGROUND OF THE INVENTION

The general problem addressed by this invention is the low productivity of human knowledge workers who use labor-intensive manual processes to work with collections of computer files. One promising solution strategy for this software productivity problem is to build automated systems to replace manual human effort.

Unfortunately, replacing arbitrary manual processes performed on arbitrary computer files with automated systems is a difficult thing to do. Many challenging subproblems must be solved before competent automated systems can be constructed. As a consequence, the general software productivity problem has not been solved yet, despite large industry investments of time and money over several decades.

The present invention provides one piece of the overall functionality required to implement automated systems for processing collections of computer files. In particular, the current invention has a practical application in the technological arts because it provides both humans and software programs with an easy, convenient way of generating complex makefiles to control the automated processing of collections of computer files.

Introduction to Makefiles

Makefiles are input files for application "make" programs that interpret input makefiles and subsequently issue useful computer processing commands specified by input makefiles. The first make program was created to manage the efficient construction of software programs that were comprised of many program source files.

The main problem to be solved by the original make program was that humans could not reliably figure out which source files needed to be recompiled after each program source code modification was made. Specifically, humans could not easily keep track of the various interdependencies that typically existed among multiple source files. Missing dependency relationships frequently lead to failed compilations, incorrect results, wasted time, and overall lower software development productivity. Prior to the invention of make programs, the only reliable way of ensuring a correct software build was to rebuild all files after each modification. This was very costly in terms of computer resources and wasted human programming time.

The first make program was invented to solve this dependency tracking problem. Input makefiles record dependency information and computer processing commands, such that only an optimal number of commands need be executed to propagate changed source file information into final software build products. Makefiles use a convenient declarative syntax for recording interdependencies among source files. In operation, make programs read makefiles, dynamically calculate full dependency graphs among program source files, and then execute an optimal number of commands to correctly rebuild software products.

In particular, make programs compare relative timestamp values between source files and derivative files to avoid unnecessary processing of unchanged source files. Specifically, if the timestamp on a derivative file is newer than the timestamp on the associated source file, the derivative file is not recalculated. In contrast, if the source file is newer than the derivative file, then commands are issued to rebuild the derivative file from the newer, more recently modified source file. The avoidance of unnecessary computational work ensures that a minimum number of commands are executed to correctly rebuild software products, leading to very significant increases in human productivity.

Make programs and makefiles are ubiquitous and heavily used within the software industry. Decades of industry experience have shown that make programs are very useful for many other applications beyond compiling and linking software products. Thus to a first approximation, make programs are useful programs for managing and executing arbitrary command sequences for arbitrary computational purposes.

High Manual Makefile Costs

Unfortunately, make programs give rise to another significant productivity problem, which is the ubiquitous problem of manually creating and maintaining makefiles. Manually creating and maintaining makefiles is time consuming, costly, and error prone for several reasons.

First, a significant amount of human time is required for programmers to first learn about make programs and makefiles. The knowledge burden imposed on individual programmers is consequential, especially if advanced or complex features of make programs must be understood.

Second, creating makefiles typically requires that programmers manually list all source files, dependencies, processing commands, processing variations, and makefile targets that are involved in make operations. These requirements are not demanding for trivially simple programs when only a few processing operations are involved. However, the requirements rapidly become very demanding, time consuming, and complex as the number of source files, dependencies, performed command sequences, process variations, and makefile targets increase in number.

Third, software maintenance costs caused by ongoing development activities are significant, especially for makefiles that are used to manage medium or large software systems. Because makefiles describe precise, particular computerized processes, makefiles must be frequently modified to produce variations in makefile processes to satisfy various processing situations. For example, it is common to modify makefiles to do the following things: to add debugging flags to compiler command lines; to add new versions of link libraries; to add program optimization flags to linkers; to change the location of imported or exported files; to add or remove source files to create a functional variation of the final software product; and to clone and modify a makefile for use on another computing platform, or to use with a different make program.

Fourth, evolutionary changes in computer environments often cause precision makefiles to "break" in some way. For example, program names might change, locations of installed software tools might change, command options of installed software tools might change, source file locations might be changed by reorganizations as projects grow, and so on. Since makefiles describe precise, complex processes, even small changes in computing environments can generate disproportionately large makefile maintenance costs.

Fifth, human programming mistakes or modifications that "break" makefiles may trigger many downstream costs, ranging from wasted program test runs to increased makefile debugging costs. For example, it is easy for humans to miss a dependency, omit a source file, or make a mistake when working on complex makefiles for large software systems. These increased downstream costs can be significant, ranging from trival losses of a few minutes here and there on small projects to consequential losses of several days or weeks on large, more complex projects where feedback cycle times are longer.

As can be seen from the above, manual makefile techniques clearly lower human productivity. One obvious approach for solving the problem is to automate the creation and maintenance of makefiles. But that is not a simple problem, as the following discussion will show.

Process Variance in Makefiles

The makefile generator problem is very difficult, primarily because of the large amounts of variance within every dimension of the makefile problem. In general, makefiles were designed to manage the application of arbitrary computer command sequences to arbitrary collections of computer files written in arbitrary computer languages, and containing arbitrary interdependencies in those languages. Further practical complications include using arbitrary computing platforms, arbitrary software toolsets, and arbitrary administrative policies.

A final complication is that many of the factors listed above are coupled, so that decisions in one dimension affect decisions in other dimensions. For example, choosing to use a particular software tool may affect the design of the overall processing sequence. Choosing a particular computing platform affects the software tools that must be used, and thus the command sequences that can be used, and so on. The knowledge content of complex makefiles can stretch across many coupled dimensions.

Importantly, each completed makefile must rationalize all of the influences and factors listed above, and ultimately embody a singular, precise, and particular solution to a particular set of problem parameters. Since even human programmers have practical difficulties working with such makefiles, constructing automated makefile generators to produce makefiles of similar complexity is obviously difficult.

To simplify description of the makefile generation problem, the next section identifies several important subproblems that must be solved in order to build a competent collection makefile generator. The following discussion contemplates a fully automated makefile generator program, capable of producing industrial-strength makefiles suitable for large software projects.

Further, the discussion uses the term "collection" to mean a structured collection of arbitrary computer files. Collections are described in detail later in this document.

Problems to be Solved

The Collection Information Management problem is an important, fundamental problem that must be solved to enable the construction of automated collection processing systems. It is the problem how to model, manage, and provide collection instance information, collection content file information, and collection data type information for eventual use by application programs that process collections.

Some interesting aspects of the Collection Information Management Problem are these: large numbers of collections can exist; collections can have arbitrary per-instance specifier data; collections can contain many arbitrary computer files for content; collections can require that arbitrary processes be run on the collection content; collections can share sets of structural and processing characteristics; many software programs can require access to information about collections; collection representations must accommodate variances in computing platforms, administrative policies, and software processing tools; and collections must be resistant to scale up failure.

The Collection Information Management Problem is addressed by the "Collection Information Manager" patent application listed at the beginning of this document.

The Collection Content Classification Problem is another important problem that must be solved to enable the construction of automated collection processing systems. It is the problem of how to determine collection content members, content types, content processing actions, and content processing interdependencies. Solving the content classification problem is important because a solution would enable application programs to process collections of computer files in more powerful, more automated ways than were previously possible.

Some interesting aspects of the Collection Content Classification Problem are these: arbitrary collection types may be involved, containing arbitrary internal structures, numbers of internal products and product types. Arbitrary numbers of files and file types may be involved, requiring arbitrary content processing actions, platform dependent processing actions, and arbitrary administrative preferences for all of the above.

The collection content classification problem is addressed by the "Collection Content Classifier" patent application listed at the beginning of this document.

The Collection Makefile Generator Problem is another important problem that must be solved to enable the construction of automated collection processing systems. It is the problem of how to automatically calculate and generate a precision makefile for managing the efficient application of complex computer command sequences to various collections of computer files. Solving the makefile generator problem is important because a solution would drastically increase human productivity and decrease makefile creation and maintenance costs.

Some interesting aspects of the Collection Makefile Generator Problem are these: collections may have arbitrary data types, internal structures, internal products and product types. Arbitrary numbers of content files and file types may be involved, written in various programming languages, and requiring arbitrary processing actions and platform dependent processing actions. Arbitrary administrative preferences for all of the above may be required. In addition, variations may be required on all of the above for purposes such as debugging, testing, optimizing, and for varying final product contents. As those skilled in the art can appreciate, the overall Collection Makefile Generator Problem is not a simple problem.

The Multiple Product Build Order Problem is another important problem to solve. It is the problem of how to ensure that multiple products within one collection are processed in correct dependency order to ensure proper software build results.

Some interesting aspects of the Collection Product Build Order Problem are that an arbitrary number of user-defined product types may be involved, with arbitrary interdependency relationships among the various product types.

The Product File Build Order Problem is another important problem to solve. It is the problem of how to ensure that particular files within one product within one collection are processed in correct dependency order to ensure proper software build results.

Some interesting aspects of the Product File Build Order Problem are that an arbitrary number of special file types may be involved, with arbitrary interdependency relationships among the various file types.

The Include File Directory Problem is another important problem to solve. It is the problem of ensuring that there is a one-to-one match between (a) the include files that are found using makefile generator search rules and that are subsequently listed as dependencies within the makefile, and (b) the include files that are found using compiler search rules at compiler runtime. If a mismatch occurs, an incorrect build sequence or a wasteful build sequence may occur.

Some interesting aspects of the Include File Directory Problem are these: multiple search directories may be used; multiple different compilers may be used; include file search directories can vary with compilers; include files selected for makefile dependencies must match include files selected for compilation; and administrative policy conventions may include or exclude the use of include file dependencies in generated makefiles.

The Library File Directory Problem is another important problem to solve. It is the problem of ensuring that there is a one-to-one match between (a) the library files that are found by makefile generator library search rules and that are subsequently listed as dependencies within a makefile, and (b) the library files that are found by linker search rules at linker runtime. If a mismatch occurs, an incorrect build sequence or a wasteful build sequence may occur.

Some interesting aspects of the Library File Directory Problem are these: multiple search directories may be used; multiple different linkers may be used; library file search directories can vary with linkers; platform-dependent libraries may be used; and administrative policy conventions may include or exclude the use of library file dependencies in generated makefiles.

The Multiple Product Naming Problem is another important problem to solve. It is the problem of managing name conflicts within makefiles that build multiple products from the same set of source files, where the build command sequences differ among products. Each product must use its own namespace to avoid macro, file, and target name collisions with other products that are part of the same makefile.

Some interesting aspects of the Makefile Multiple Product Problem are these: many collection products may be involved; products can have arbitrary product types and product content files; each product may require different, platform-dependent processing actions; each file name, target name, or macro name reused by multiple products must be distinguished from other uses of the name; and multiple platform-dependent versions of same-name products may be required, increasing the probability of name conflicts within the final makefile.

The Makefile Parallel Processing Problem is another important problem to solve. It is the problem of how to optimally use available parallel processing power to perform makefile operations in a minimum amount of time. The main goal is to identify makefile targets that can benefit from parallel processing, and to emit further makefile targets to implement the desired makefile processing parallelism.

Some interesting aspects of the Parallel Makefile Target Problem are these: there is an inherent limit to the amount of parallelism that can be achieved within each collection of files to be processed; there is a physical limit to the amount of parallel processing power available in each computational environment; and there is a policy limit to the amount of parallelism that can be used by makefiles in each administrative environment. Ideally, the inherent problem parallelism limit should be less than the physical parallelism limit, and the physical parallelism limit should be less than the administrative parallelism limit.

The Template Sharing Problem is another important problem to solve. It is the problem of how to optimally share makefile generator template files among various computing platforms to maximize software reuse and minimize software maintenance costs. For example, some (platform-independent) templates can be used by all platforms, some templates by all "win" (windows) platforms, and some templates only by the single "win98.plt" platform.

Some interesting aspects of the Template Sharing Problem are these: many platforms may be involved; many templates may be involved; several different levels of sharing between platform-independent and platform-specific abstraction levels may be required; and desired templates may vary with collection type, product type, content type, and action type.

The Makefile Customization Problem is another important problem to solve. It is the problem of effectively representing and using all the variances in platforms, processes, programs, policies, etcetera, that were mentioned earlier, so that humans can customize all inputs to the makefile generation process. Competent automated makefile generators must clearly be able to accommodate the kind of customizations and variances found in real world industrial environments. If they cannot, a general solution to the makefile generation problem cannot be achieved. A workable solution to this problem is very, very important for the utility and success of automated makefile generators.

As the foregoing discussion suggests, makefile generation is a complex problem. Many important issues must be solved in order to create competent makefile generators. No competent general solution to the overall makefile generation problem is visible in the prior art today, even though the first make program was created in the 1970s, well over two decades ago.

General Shortcomings of the Prior Art

A professional prior art search for the present invention was performed, but produced no meaningful, relevant works of prior art. Therefore the following discussion is general in nature, and highlights the significant conceptual differences between file-oriented mechanisms in the prior art and the novel collection-oriented mechanisms represented by the present invention.

Prior art approaches lack support for collections. This is the largest limitation of all because it prevents the use of high-level collection abstractions that can significantly improve productivity.

Prior art approaches lack automated support for dynamically determining lists of collection content files to be processed by makefiles, thereby requiring humans to manually construct content file lists, and thereby increasing makefile creation and maintenance costs.

Prior art approaches lack automated support for multiple software products that are to be produced from the same collection of files, thereby requiring humans to manually create makefile code for multiple products, and thereby increasing makefile creation and maintenance costs.

Prior art approaches lack automated support for determining relative build order among multiple software products that are to be produced from the same collection of files, thereby requiring humans to manually declare relative build orders for multiple products, and thereby increasing makefile creation and maintenance costs.

Prior art approaches lack automated support for resolving name conflicts within makefiles that produce multiple software products from the same set of source files, thereby requiring humans to manually repair name conflicts, and thereby increasing makefile creation and maintenance costs.

Prior art approaches lack automated support for dynamically locating include files to participate in dependency relationships within the makefile, thereby requiring humans to manually declare such dependencies, and thereby increasing makefile creation and maintenance costs.

Prior art approaches lack automated support for dynamically locating library files to participate in dependency relationships within the makefile, thereby requiring humans to manually declare such dependencies, and thereby increasing makefile creation and maintenance costs.

Prior art approaches lack automated support for dynamically determining dependencies in arbitrary programming languages, thereby requiring humans to manually declare such dependencies, and thereby increasing makefile creation and maintenance costs.

Prior art approaches lack automated support for generating makefiles that support parallel execution behavior, thereby preventing the general use of parallel computing capacity to reduce makefile execution times.

Prior art approaches lack well-structured support for sharing makefile templates among across multiple computing platforms, thereby requiring multiple copies of makefile template information, and thereby increasing software maintenance costs.

Prior art approaches lack well-structured support for modelling large ranges of process variance and makefile customizations found within industrial software environments, thereby preventing the widespread use of fully automated makefile generators within industrial environments.

As can be seen from the above description, prior art mechanisms in general have several important disadvantages. Notably, general prior art mechanisms do not provide fully automated support for collections, dynamic determination of content files, multiple products, extensive makefile variance, or parallel execution support.

In contrast, the present collection makefile generator invention has none of these limitations, as the following disclosure will show.

Specific Shortcomings in Prior Art

Several examples of prior art makefile generators are discussed below. The examples fall into two main categories: makefile generator programs and integrated development environment (IDE) programs. Both types of programs generate makefiles so that project source files can be processed efficiently in an automated manner.

Prior Art Makefile Generators

Makefile generator programs generate makefiles for humans who are building software programs. Typically, makefiles contain computer instructions for compiling source code files and linking compiled object files to produce executable files or libraries of object files. Also typically, programmers include a variety of other useful command sequences in makefiles to increase productivity.

Some examples of popular freeware makefile generators include automake, imake, and mkmf (make makefile). One example of a patented makefile generator is U.S. Pat. No. 5,872,977 "Object-Oriented Method and Apparatus For Creating A Makefile" by Thompson, which describes an object-oriented method of generating makefiles from input build files and input rule files. Although each of these prior art approaches is useful in some way, each approach has several important shortcomings.

GNU automake has no dynamic content discovery mechanism; instead it requires programmers to manually list all files that require processing. Neither does it have a mechanism for sharing content classification information, so multiple automake files cannot easily share user-provided policy information. Finally, it uses an input file that must be manually constructed, and so its classification operations are not fully automated.

Imake has no support for dynamic content discovery; no automated support for multiple products, or for parallel targets. Finally, it uses an input file that must be manually constructed, and so its classification operations are not fully automated.

Mkmf does have a dynamic content discovery mechanism that dynamically includes all source files in the current directory in the output makefile. However, only the current directory is used to find source files; no other directories are supported. Moreover, all source files in the directory are included in the makefile, whether they should be or not. Finally, all files are used to build one product only; files cannot be grouped into multiple products.

The makefile generator approach described by Thompson in U.S. Pat. No. 5,872,977 has no support for dynamic content discovery; no automated support for multiple products, or for parallel targets. Finally, it uses a platform-independent input build file that must be manually constructed, and so its classification operations are not fully automated.

Prior Art IDEs

Integrated development environments provide programmers with a development program that integrates many software development tools such as editors, compilers, linkers, debuggers, and online documentation. Importantly, many IDE programs contain a small internal makefile generator to generate makefiles to control the software build process.

However, IDEs typically have no support for dynamic content discovery; no fully automated support for multiple products (human interaction is typically required), no support for parallel targets; and no support for collections in general.

As can be seen from the above description, prior art approaches have several important disadvantages. In contrast, the present makefile generator invention has none of these limitations, as the following disclosure will show.

SUMMARY OF THE INVENTION

A Collection Makefile Generator automatically generates complex, precision makefiles for processing collections, thereby significantly improving the productivity of humans that work with makefiles.

In operation, a collection makefile generator performs the following operations: dynamically determines a list of collection content files and a list of collection products; analyzes and classifies the content files to determine their data types; determines dependencies for content files with respect to include files and library files; determines appropriate command sequences for processing the content files to build the collection products; determines a set of parallel targets to support parallel makefile executions; determines customizations in accordance with site administrative policies, and finally emits a customized makefile for processing the host collection of computer files.

Thus the present collection makefile generator invention uses extensive amounts of dynamically obtained knowledge to generate correct, efficient, and complex makefiles, in a convenient, fully automated way that was not previously available.

OBJECTS AND ADVANTAGES

The main object of collection makefile generators is to automatically generate competent, industrial-strength makefiles for processing collections, thereby promoting the construction of fully automated collection processing systems. Fully automated collection processing systems can significantly improve human productivity by processing collections of computer files in ways that were not possible before.

Other objects of the present invention, based on the limitations described above, include: to support collections; to dynamically determine collection content; to support multiple products; to determine relative build orders among multiple products; to resolve name conflicts caused by multiple products using the same source files; to dynamically locate include files and library files; to support determination of processing dependencies in multiple programming languages; to generate makefiles that support parallel execution behavior; to provide well-structured organizational support for template sharing; and to provide modeling support for large variances in makefile processes and site customization conventions.

A final object is to provide a general, scalable, and automated collection makefile generator means, thereby promoting the construction of scalable automated collection processing systems.

As can be seen from the objects above, collection makefile generators can provide many useful services to humans and application programs that process collections. Collection makefile generators improve human productivity by making it both possible and convenient to automatically generate complex makefiles for processing collections in complex, scalable, and automated ways that were not previously possible.

Further advantages of the present collection makefile generator invention will become apparent from the drawings and disclosure below.

BRIEF DESCRIPTION OF DRAWINGS

FIG. 1 shows a sample prior art filesystem folder in a typical personal computer filesystem.

FIG. 2 shows how a portion of the prior art folder in FIG. 1 has been converted into a collection 100 by the addition of a collection specifier file 102 named "cspec" FIG. 2 Line 5.

FIG. 3 shows an example physical representation of a collection specifier 102, implemented as a simple text file such as would be used on a typical personal computer filesystem.

FIG. 8 shows an example software collection datastructure that relates collection specifier and collection content information for a single collection instance.

FIG. 9 shows an example collection type definition datastructure, such as might be used by software programs that process collections.

FIG. 10 shows a more detailed example of the kinds of information found in collection type definitions.

FIG. 13 shows a simplified architecture for a collection makefile manager module 130.

FIG. 14 shows a simplified algorithm for a collection makefile manager module 130.

FIG. 15 shows a simplified architecture for a product makefile manager module 140.

FIG. 16 shows a simplified algorithm for a product makefile manager module 140.

FIG. 21 shows an example collection tree.

FIG. 22 shows an example collection specifier file for the collection tree of FIG. 21.

FIG. 23 shows part 1 of an example output from a collection content classifier module, for the collection of FIG. 23.

FIG. 24 shows part 2 of an example output from a collection content classifier module, for the collection of FIG. 23.

FIG. 25 shows a four-level type definition hierarchy for storing collection type definition information.

FIG. 26 shows an example collection type index table and an example collection type definition file.

FIG. 27 shows an example product type index table and an example product type definition file.

FIG. 28 shows an example content type index table and an example content type definition file.

FIG. 29 shows an example action type index table and an example action type definition file.

FIG. 30 shows an example makefile service index table.

FIG. 31 shows an example collection-level makefile service fragment for defining platform information.

FIG. 32 shows an example collection-level makefile service fragment for defining site specific information.

FIG. 33 shows an example collection-level makefile service fragment for defining software tool names information.

FIG. 34 shows an example collection-level makefile service fragment for defining compiler information.

FIG. 35 shows an example collection-level makefile service fragment for defining filename suffix information.

FIG. 36 shows an example collection-level makefile service fragment for defining default makefile target information.

FIG. 37 shows a list of fragment commands.

FIG. 38 shows an example makefile base template fragment.

FIG. 39 shows a partially assembled makefile constructed from a base template and several collection-level makefile service fragments.

FIG. 40 shows an example product-level, platform independent makefile service fragment for a program product, for constructing a list of object files to make an executable program.

FIG. 41 shows an example product-level, operating system dependent makefile service fragment for a program product, for adding dependencies to build and export targets.

FIG. 42 shows an example product-level, platform dependent makefile service fragment for a program product, for linking an executable program.

FIG. 43 shows an example table of fragment substitution strings.

FIG. 44 shows a partially assembled makefile after inserting the fragment from FIG. 40.

FIG. 45 shows a partially assembled makefile after inserting fragments from FIG. 41 and FIG. 42.

FIG. 46 shows an example content-level makefile service fragment for constructing makefile macros that contain lists of C source files.

FIG. 47 shows an example action-level makefile service fragment for compiling a C source file.

FIG. 48 shows a partially assembled makefile after inserting fragments from FIG. 46 and FIG. 47.

FIG. 49 shows an example collection specifier file containing standalone makefile services in both the collection and product sections of the specifier file.

FIG. 50 shows how name collisions among multiple products can be avoided using fragment substitution strings.

FIG. 51 shows an example product build order table.

FIG. 52 shows how product build ordering is implemented by left-to-right ordering of build target dependencies.

FIG. 53 shows an example file build order table.

FIG. 54 shows how product file ordering is implemented by left-to-right ordering of build target dependencies.

FIG. 55 shows an example set of include file search directories.

FIG. 56 shows how include file search directories are used in compiler statements in makefile code.

FIG. 57 shows an example set of library file search directories.

FIG. 58 shows how library file search directories are used in linker statements in makefile code.

FIG. 59 shows an example virtual platform table.

FIG. 60 shows how a virtual platform table can be used to generate lists of search directories for particular platforms.

FIG. 61 shows an example collection specifier file containing platform dependent collection specifier statements.

FIG. 62 shows how parallel makefile targets can be used to obtain processing parallelism in makefiles.

FIG. 63 shows how the action-level fragment of FIG. 47 can be extended to support parallel makefile targets.

FIG. 64 shows a partially assembled makefile after inserting the fragment from FIG. 63.

FIG. 65 shows a partially assembled makefile that supports parallel building of all products, and of individual products.

LIST OF DRAWING REFERENCE NUMBERS

Figure 4:
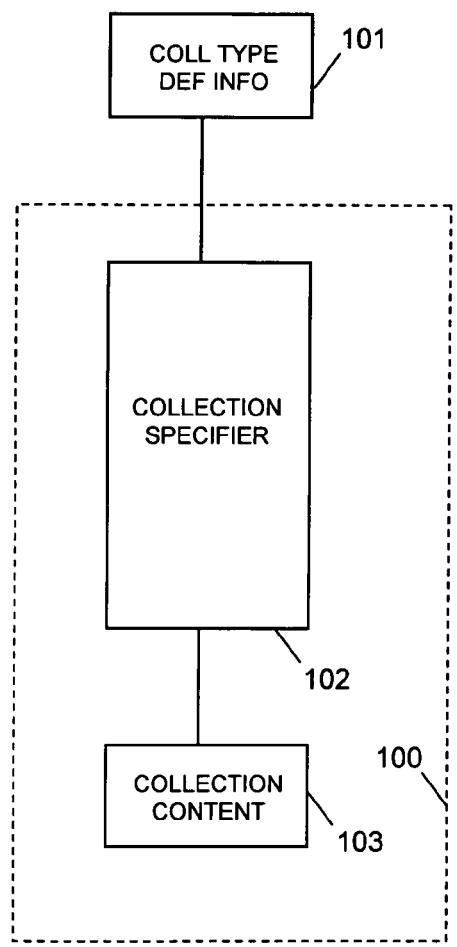
FIG. 4 shows four major information groupings for collections, including collection type definition 101, collection specifier 102, collection content 103, and collection 100.

100 A collection formed from a prior art folder
101 Collection type definition information
102 Collection specifier information
103 Collection content information
104 Per-collection collection processing information
105 Per-collection collection type indicator
106 Per-collection content link specifiers
107 Collection information
110 Application program means
111 Collection information manager means
112 Collection type definition API means
113 Collection specifier API means
114 Collection content API means
115 Collection type definition server means
116 Collection specifier server means
117 Collection content server means
120 Collection makefile generator program
121 Get Runtime Information module
122 Collection content classifier means
130 Collection makefile manager module
131 Process collection services module
132 Do collection type definition services module
133 Do collection standalone services module
134 Sort product build orders module
135 Calculate collection parallel targets module
140 Product makefile manager module
141 Process product services module
142 Do product type definition services module
143 Do product standalone services module
144 Sort file build orders module
145 Calculate library search directories
146 Calculate product parallel targets module
150 File makefile manager module
151 Calculate include search directories
152 Do file type definition services module
153 Do action type definition services module
160 Process makefile service module
161 Substitute makefile fragment module
162 Insert makefile fragment module

DETAILED DESCRIPTION

Overview of Collections

This section introduces collections and some related terminology.

Collections are sets of computer files that can be manipulated as a set, rather than as individual files. Collection information is comprised of three major parts: (1) a collection specifier that contains information about a collection instance, (2) a collection type definition that contains information about how to process all collections of a particular type, and (3) optional collection content in the form of arbitrary computer files that belong to a collection.

Collection specifiers contain information about a collection instance. For example, collection specifiers may define such things as the collection type, a text summary description of the collection, collection content members, derivable output products, collection processing information such as process parallelism limits, special collection processing steps, and program option overrides for programs that manipulate collections. Collection specifiers are typically implemented as simple key-value pairs in text files or database tables.

Collection type definitions are user-defined sets of attributes that can be shared among multiple collections. In practice, collection specifiers contain collection type indicators that reference detailed collection type definitions that are externally stored and shared among all collections of a particular type. Collection type definitions typically define such things as collection types, product types, file types, action types, administrative policy preferences, and other information that is useful to application programs for understanding and processing collections.

Collection content is the set of all files and directories that are members of the collection. By convention, all files and directories recursively located within an identified set of subtrees are usually considered to be collection members. In addition, collection specifiers can contain collection content directives that add further files to the collection membership. Collection content is also called collection membership.

Collection is a term that refers to the union of a collection specifier and a set of collection content.

Collection information is a term that refers to the union of collection specifier information, collection type definition information, and collection content information.

Collection membership information describes collection content.

Collection information managers are software modules that obtain and organize collection information from collection information stores into information-rich collection data structures that are used by application programs.

Collection Physical Representations—Main Embodiment

FIGS. 1–3 show the physical form of a simple collection, as would be seen on a personal computer filesystem.

FIG. 1 shows an example prior art filesystem folder from a typical personal computer filesystem. The files and directories shown in this drawing do not implement a collection 100, because no collection specifier 102, FIG. 2 Line 5 exists to associate a collection type definition FIG. 4 101 with collection content information FIG. 4 103.

FIG. 2 shows the prior art folder of FIG. 1, but with a portion of the folder converted into a collection 100 by the addition of a collection specifier file FIG. 2 Line 5 named "cspec". In this example, the collection contents FIG. 4 103 of collection 100 are defined by two implicit policies of a preferred implementation.

First is a policy to specify that the root directory of a collection is a directory that contains a collection specifier file. In this example, the root directory of a collection 100 is a directory named "c-myhomepage" FIG. 2 Line 4, which in turn contains a collection specifier file 102 named "cspec" FIG. 2 Line 5.

Second is a policy to specify that all files and directories in and below the root directory of a collection are part of the collection content. Therefore directory "s" FIG. 2 Line 6, file "homepage.html" FIG. 2 Line 7, and file "myphoto.jpg" FIG. 2 Line 8 are part of collection content FIG. 4 103 for said collection 100.

FIG. 3 shows an example physical representation of a collection specifier file 102, FIG. 2 Line 5, such as would be used on a typical personal computer filesystem.

Collection Information Types

Figure 5:
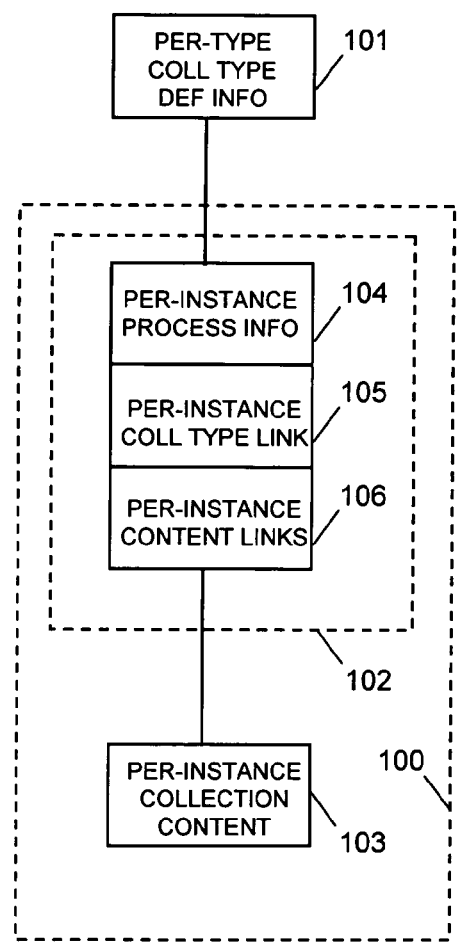
FIG. 5 shows a more detailed view of the information groupings in FIG. 4, illustrating several particular kinds of per-collection-instance and per-collection-type information.

FIGS. 4–5 show three kinds of information that comprise collection information.

FIG. 4 shows a high-level logical structure of three types of information that comprise collection information: collection processing information 101, collection specifier information 102, and collection content information 103. A logical collection 100 is comprised of a collection specifier 102 and collection content 103 together. This diagram best illustrates the logical collection information relationships that exist within a preferred filesystem implementation of collections.

FIG. 5 shows a more detailed logical structure of the same three types of information shown in FIG. 4. Collection type definition information FIG. 4 101 has been labeled as per-type information in FIG. 5 103 because there is only one instance of collection type information 101 per collection type. Collection content information FIG. 4 103 has been labeled as per-instance information in FIG. 5 103 because there is only one instance of collection content information per collection instance. Collection specifier information 102 has been partitioned into collection instance processing information 104, collection-type link information 105, and collection content link information 106. FIG. 5 is intended to show several important types of information 104–106 that are contained within collection specifiers 102.

Figure 6:
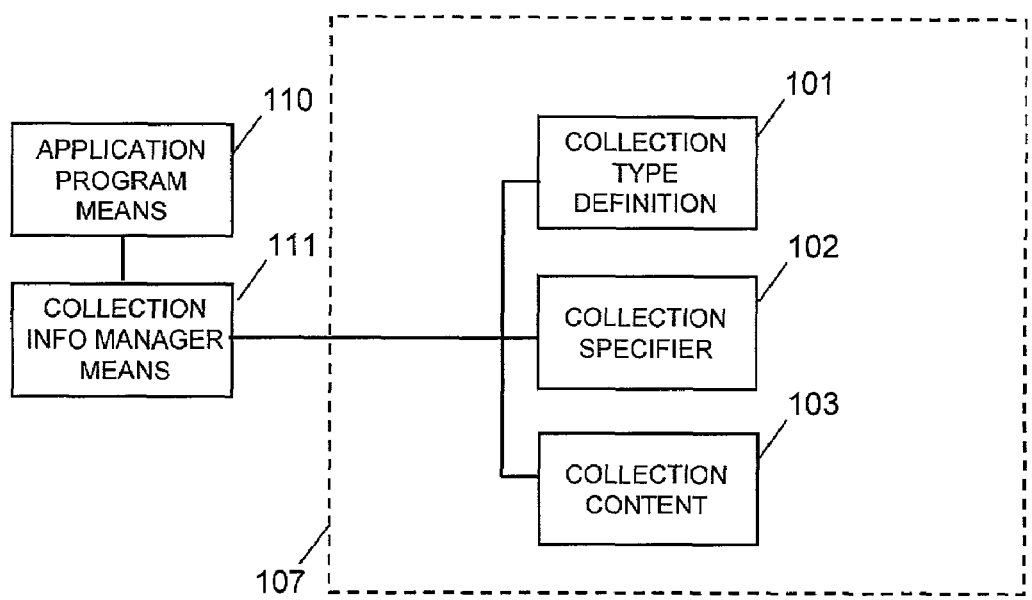
FIG. 6 shows a logical diagram of how a Collection Information Manager Means 111 would act as an interface between an application program means 110 and a collection information means 107, including collection information sources 101–103.

Suppose that an application program means FIG. 6 110 knows (a) how to obtain collection processing information 101, (b) how to obtain collection content information 103, and (c) how to relate the two with per-collection-instance information 102. It follows that application program means 110 would have sufficient knowledge to use collection processing information 101 to process said collection content 103 in useful ways.

Collection specifiers 102 are useful because they enable all per-instance, non-collection-content information to be stored in one physical location. Collection content 103 is not included in collection specifiers because collection content 103 is often large and dispersed among many files.

All per-collection-instance information, including both collection specifier 102 and collection content 103, can be grouped into a single logical collection 100 for illustrative purposes.

Collection Application Architectures

Figure 7:
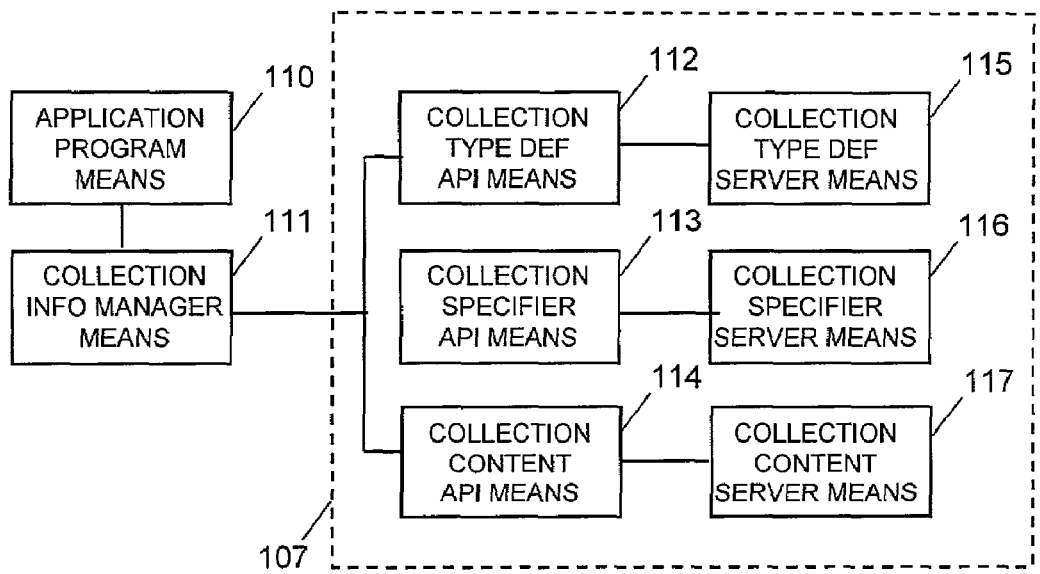
FIG. 7 shows a physical software embodiment of how an Application Program Means 110 would use a Collection Information Manager Means 111 to obtain collection information from various collection information API means 112–114 connected to various collection information server means 115–117.

FIGS. 6–7 show example collection-enabled application program architectures.

FIG. 6 shows how a collection information manager means 111 acts as an interface between an application program means 110 and collection information means 107 that includes collection information sources 101–103. Collectively, collection information sources 101–103 are called a collection information means 107. A collection information manager means 111 represents the union of all communication mechanisms used directly or indirectly by an application program means 110 to interact with collection information sources 101–103.

FIG. 7 shows a physical software embodiment of how an application program means 110 could use a collection information manager means 111 to obtain collection information from various collection information API (Application Programming Interface) means 112–114 connected to various collection information server means 115–117.

Collection type definition API means 112 provides access to collection type information available from collection type definition server means 115. Collection specifier API means 113 provides access to collection specifier information available from collection specifier server means 116. Collection content API means 114 provides access to collection content available from collection content server means 117.

API means 112–114, although shown here as separate software components for conceptual clarity, may optionally be implemented wholly or in part within a collection information manager means 111, or within said server means 115–117, without loss of functionality.

API means 112–114 may be implemented by any functional communication mechanism known to the art, including but not limited to command line program invocations, subroutine calls, interrupts, network protocols, or file passing techniques.

Server means 115–117 may be implemented by any functional server mechanism known to the art, including but not limited to database servers, local or network file servers, HTTP web servers, FTP servers, NFS servers, or servers that use other communication protocols such as TCP/IP, etc.

Server means 115–117 may use data storage means that may be implemented by any functional storage mechanism known to the art, including but not limited to magnetic or optical disk storage, digital memory such as RAM or flash memory, network storage devices, or other computer memory devices.

Collection information manager means 111, API means 112–114, and server means 115–117 may each or all optionally reside on a separate computer to form a distributed implementation. Alternatively, if a distributed implementation is not desired, all components may be implemented on the same computer.

Collection Data Structures

FIGS. 8–10 show several major collection data structures.

FIG. 8 shows an example collection datastructure that contains collection specifier and collection content information for a collection instance. Application programs could use such a datastructure to manage collection information for a collection that is being processed.

In particular, preferred implementations would use collection datastructures to manage collection information for collections being processed. The specific information content of a collection datastructure is determined by implementation policy. However, a collection specifier typically contains at least a collection type indicator FIG. 8 Line 4 to link a collection instance to a collection type definition.

FIG. 9 shows an example collection type definition datastructure that could be used by application programs to process collections. Specific information content of a collection type definition datastructure is determined by implementation policy. However, collection type definitions typically contain information such as shown in FIGS. 9–10.

FIG. 10 shows example information content for a collection type definition datastructure such as shown in FIG. 9. FIG. 10 shows information concerning internal collection directory structures, collection content location definitions, collection content datatype definitions, collection processing definitions, and collection results processing definitions. The specific information content of a collection type definition is determined by implementation policy. If desired, more complex definitions and more complex type definition information structures can be used to represent more complex collection structures, collection contents, or collection processing requirements.

Overview of Makefile Generation

This section provides a high-level overview of the major players in makefile generation for collections.

One player is a Collection Makefile Generator Program 120, whose overall architecture is shown by FIGS. 11, 13, 15, 17 and 19. This program is responsible for generating a specific and correct makefile for processing the host collection.

Another player is a Collection Content Classifier Means 122. This subsystem is responsible for analyzing the host collection, and providing detailed collection content classification information to the Collection Makefile Generator Program 120. Collection content classification is a significant problem in its own right. Thus Collection Content Classifiers are discussed at length in a separate patent application "Collection Content Classifier" listed in the related applications section of this document.

Another player is collection information for the host collection. In particular, the collection specifier part of the collection information for the host collection contains additional information that is not picked up and passed on by the Collection Content Classifier Means 122 described above. Instead, Collection Makefile Generator Manager 130 reads collection specifier information directly.

Another player is collection type definition information, for characterizing the particular collection type of the host collection. Collection type definition information such as shown in FIGS. 25–36 not only describes characteristics of particular collection types, but also specifies various makefile code fragments for processing collections of particular collection types.

In overall operation, a Collection Makefile Generator Program 120 uses a Collection Content Classifier Means 122 to obtain classification information for a host collection. Further, Collection Makefile Manager 130 also obtains collection information from the collection specifier of the host collection, and associated collection type definition for the collection. Having thus obtained all relevant knowledge about the collection instance (from the collection specifier), its classified contents, and its collection type and makefile processing conventions, Collection Makefile Manager 130 generates a correct makefile.

The following description of the main embodiment is organized as follows. First, overall program architecture and simplified operation will be described. Second, collection classification information will be described. Third, type definition information will be described. And fourth, additional makefile generator operations will be described.

Program Architecture

Figures 11, 12:
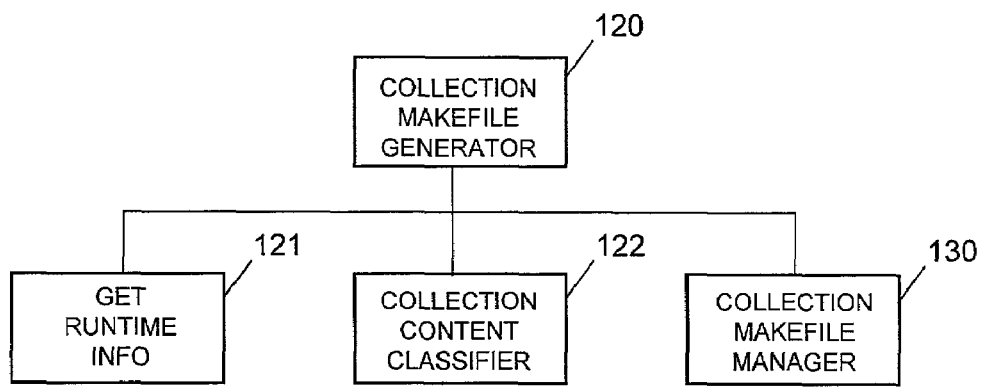
FIG. 11 shows a simplified architecture for a collection makefile generator program 120.
FIG. 12 shows a simplified algorithm for a collection makefile generator program 120.

FIG. 11 shows a simplified architecture for a collection makefile generator program 120. A collection makefile generator program generates makefiles for collections in a fully automated way, thereby improving programmer productivity.

Module Get Runtime Information 121 obtains initial configuration, command line argument, and environment variable information, and makes it available to the program invocation.

Module Collection Content Classifier Means 122 provides a list of organized collection content information to the invocation, including lists of collection content members, their content types, processing actions that should be applied to the content members, and processing dependencies among the content members.

Module Collection Makefile Generator Manager 130 uses collection information, type definition information, and collection content classifier information to generate a makefile for processing the host collection in arbitrary ways.

Operation

In operation, Collection Makefile Generator 120 proceeds according to the simplified algorithm shown in FIG. 12.

First, Collection Makefile Generator 120 calls Get Runtime Information 121 to obtain useful invocation runtime information, including configuration settings, command line arguments, and environment variable settings.

Next, Collection Content Classifier Means 122 is used to obtain classification information for the current collection being processed. In general, the output classification information answers the following four questions about a collection: (1) What content does the collection contain? (2) What is the content type of each content file? (3) What processing actions should be carried out on each content file? (4) What processing dependencies exist among content files?

Finally, Collection Makefile Generator Manager 130 generates a working makefile for the host collection, in accordance with the previously obtained classification information, thereby fulfilling the overall function of Collection Makefile Generator Program 120.

Collection Content Classifier

Collection Content Classifier Means 122 is described at length in a related patent application (see reference information at the beginning of this document).

The main function of Collection Content Classifier Means 122 is to dynamically analyze a collection for the purpose of obtaining and organizing lists of collection content files, file content types, processing actions, and content file interdependencies. A Collection Content Classifier Means 122 is not responsible for executing processing actions on collections; instead, a Collection Content Classifier Means 122 performs only an information gathering role.

Having obtained lists of collection content members and their corresponding content types, action values, and processing interdependencies, Collection Content Classifier Manager Means 122 has completed its main function of classifying a collection, and returns classification information to Collection Makefile Generator Program 120 for use in generating a makefile for the host collection.

FIGS. 23–24 show simplified examples of classification output information produced by Collection Content Classifier Means 122. See the related patent application for more detailed information about collection content classifier output information.

Collection Makefile Manager

FIG. 13 shows a simplified architecture for a Collection Makefile Manager Module 123.

Process Collection Services 131 identifies and processes makefile services for the overall collection. Makefile services are symbolic services that eventually resolve to makefile code fragments for the final output makefile.

Makefile services for the overall collection abstraction level are defined in two places: in the collection type definition FIG. 26 and in the collection section of a collection specifier file FIG. 49 Lines 4–5. Makefile services from the two sources are processed by Do Collection Type Definition Services 132 and Do Collection Standalone Services 133, respectively.

Sort Product Build Orders 134 organizes multiple products within a collection into proper build order, thereby ensuring that processing dependencies among products are correctly followed, and thereby assuring valid product build results.

Calculate Collection Parallel Targets 135 determines the names of parallel makefile targets for supporting parallel makefile computations within parallel computing environments. Parallel computations can significantly improve computational performance by applying more computing resources to a computation.

Product Makefile Manager 140 determines makefile information for a single collection product, and inserts the resulting information into the output makefile.

Operation

In operation, Collection Makefile Manager 130 proceeds according to the simplified algorithm shown in FIG. 14.

Process Collection Services 131 retrieves collection makefile services from the collection specifier and from the associated collection type definition information. The two helper modules Do Collection Type Definition Services 132 and Do Collection Standalone Services 133 perform the work of inserting the resulting makefile code into the output makefile.

Sort Product Build Orders 134 is discussed as a special topic later in this document.

Calculate Collection Parallel Targets 135 is discussed as a special topic later in this document.

Product Makefile Manager 140 oversees the generation of product-specific makefile code.

Product Makefile Manager

FIG. 15 shows a simplified architecture for a product makefile manager module 140.

Process Product Services 141 retrieves product makefile services from the collection specifier and from the associated product type definition information. Two helper modules Do Product Type Definition Services 142 and Do Product Standalone Services 143 perform the work of inserting resulting makefile code into the output makefile.

Sort File Build Orders 144 organizes multiple files within a product into proper build order, thereby ensuring that processing dependencies among files are correctly followed, and thereby assuring valid build results.

Calculate Library Search Directories 145 determines the names of directories that contain library files that are required by collection products, usually for program linking purposes. Relevant directory names are passed to linker commands in the output makefile.

Calculate Product Parallel Targets 146 determines the names of parallel makefile targets for supporting parallel makefile computations within parallel computing environments. Parallel computations can significantly improve computational performance by applying more computing resources to a computation.

File Makefile Manager 150 determines makefile information for a single collection file, and inserts the resulting information into the output makefile.

Operation

In operation, Product Makefile Manager Module 140 proceeds according to the simplified algorithm shown in FIG. 16.

Process Product Services 141 retrieves collection makefile services from the collection specifier and from the associated collection type definition information. Two helper modules Do Product Type Definition Services 142 and Do Product Standalone Services 143 perform the work of inserting resulting makefile code into the output makefile. Sort File Build Orders 144 operation is discussed as a special topic later in this document. Calculate Library Search Directories 145 operation is discussed as a special topic later in this document.

Calculate Product Parallel Targets 146 operation is discussed as a special topic later in this document.

File Makefile Manager 150 oversees the generation of file-specific makefile code.

File Makefile Manager

Figures 17, 18:
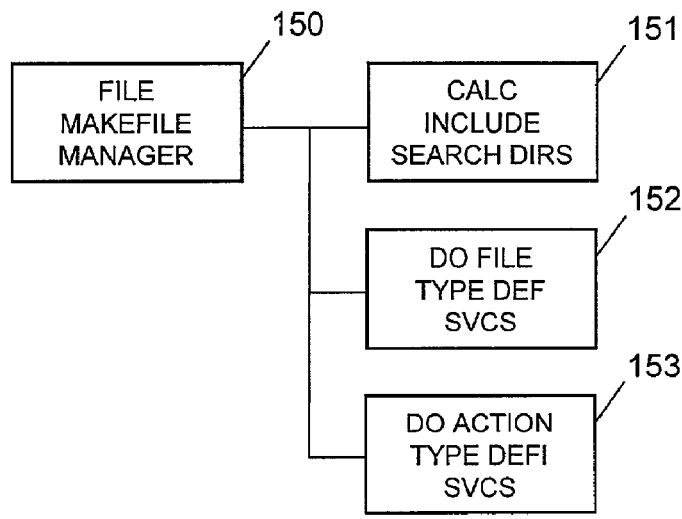
FIG. 17 shows a simplified architecture for a file makefile manager module 150.
FIG. 18 shows a simplified algorithm for a file makefile manager module 150.

FIG. 17 shows a simplified architecture for a product makefile manager module 150.

File Makefile Manager 150 retrieves file and action makefile services from the collection specifier, and from the associated type definition information.

Calculate Include Search Directories 151 determines the names of directories that contain include files required by content file dependencies, usually for compiling purposes. Relevant directory names are passed to compiler commands in the output makefile.

Do File Type Definition Services 152 processes makefile services originating in file type definition files.

Do Action Type Definition Services 153 processes makefile services originating in action type definition files.

In operation, File Makefile Manager Module 150 proceeds according to the simplified algorithm shown in FIG. 18.

Detailed algorithmic operations relating to include file search directories and processing makefile services are discussed later in this document.

Process Makefile Service

Figures 19, 20:
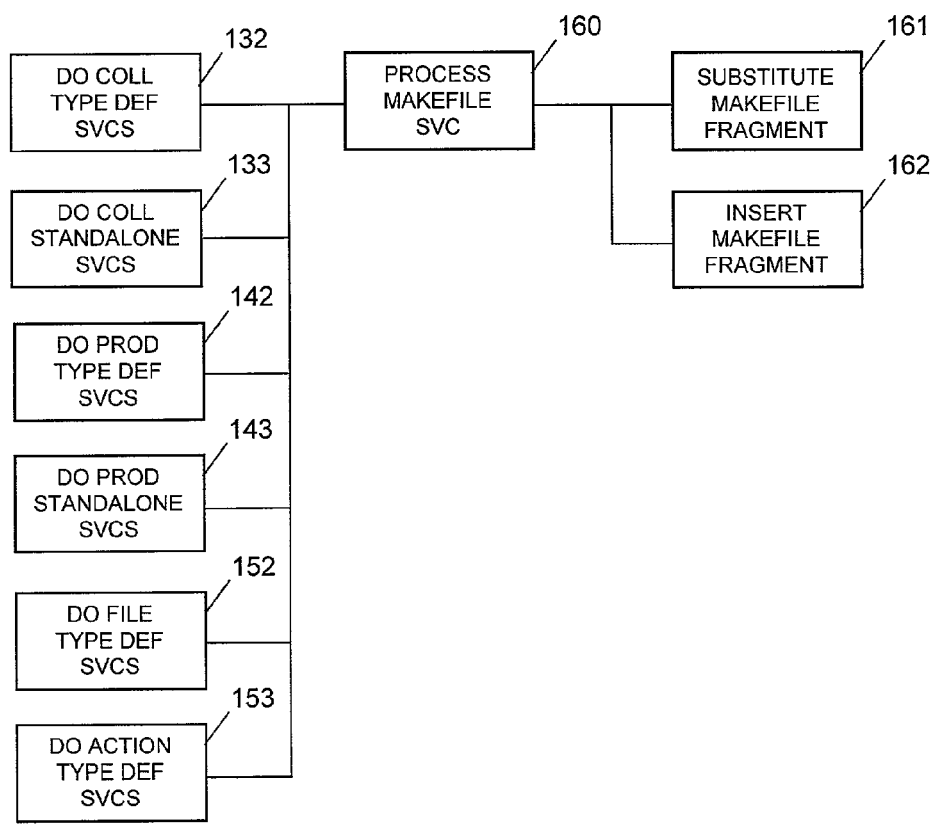
FIG. 19 shows a simplified architecture for a process makefile service module 160.
FIG. 20 shows a simplified algorithm for a process makefile service module 160.

FIG. 19 shows a simplified architecture for a Process Makefile Service Module 160.

This architecture shows that all modules for processing collection, product, file, and action services call Process Makefile Service Module 160 to perform low-level makefile service processing.

Process Makefile Service Module 160 performs low-level makefile service processing with the help of two helper modules, Substitute Makefile Fragment 161 and Insert Makefile Fragment 162.

Substitute Makefile Fragment 161 substitutes replacement string values from the current collection instance into makefile fragment templates that contain placeholder strings. This creates working, instance-specific templates that can be inserted into the output makefile.

Insert Makefile Fragment 162 inserts substituted makefile fragments into the output makefile, in proper makefile position according to various makefile fragment positioning criteria.

In operation, Process Makefile Service Module 160 proceeds according to the simplified algorithm shown in FIG. 20.

Now that overall program architecture has been described, discussion will continue by describing Type Definition Information.

Collection Classifier Information

FIGS. 21–24 collectively show an example of how collection content classifier output information models a host collection.

FIG. 21 shows a host collection containing content files and a collection specifier file Line 3. FIG. 22 shows the contents of the collection specifier file. The collection specifier specifies that two products are to be built from the collection: a program product Lines 6–10 and a library product Lines 11–14.

FIG. 23 shows example collection content classifier output for the program product. Lines 8–12 show classification information for a C header (include) file. Lines 13–19 show classification information for a C source file, including a dependency relationship Line 17 on the C header file classified by Lines 8–12.

FIG. 24 shows example collection content classifier output for the library product. Lines 10–15 show classification information for a C header (include) file. Lines 16–22 show classification information for a C source file, including a dependency relationship Line 21 on the C header file classified by Lines 10–15.

Collection classification information is obtained by Collection Content Classifier Means 122, and is passed to Collection Makefile Manager 130 for use in generating a makefile for the host collection.

This completes the presentation of collection classification information. Discussion continues with a description of type definition information, and is then followed by a detailed discussion of low level makefile generation operations.

Type Definition Information

The process of generating makefiles is essentially a matching process between collection instance information and predetermined makefile generation information. For example, a makefile generator will typically match a C program source file within a collection instance to predetermined makefile code templates for processing the C source file. Type definition information provides the required predetermined type definition information used in this matching process.

This section therefore describes a preferred implementation for type definition information.

FIG. 25 shows a four-level hierarchy for type definition information that is used by a Collection Makefile Generator Program 120.

Lines 1–4 show four important major levels in the type definition hierarchy. The first level Line 1 models whole collection types. The second level Line 2 models product types within collection types. The third level Line 3 models content types within product types. The fourth level Line 4 models action types within content types.

Importantly, each level provides human users an opportunity to customize subsequent type definition information lower in the tree. For example, two different collection types Lines 8–9 could have two completely different product type definitions for the same product name. Similarly, two different product types within the same collection type could specify lists of completely different content types, or different content definitions for the same content type name. Two different content types within the same product type could specify completely different action types, and so on.

In practice, closely related types frequently share type definition information because sharing reduces type information maintenance costs. Typically, environments that use closely related type definitions will contain more shared information than environments that use unrelated collection types. Particular amounts of information sharing and overlap are determined by implementation policy.

FIG. 25 Lines 5–23 show several related excerpts from example type definition files.

In what follows, the excerpts will be used to show how type definitions are chained together to form a type definition hierarchy for a typical collection representing a program and library written in the "C" programming language. Afterwards, discussion will continue onward with an explanation of how to construct a collection content list using the type definition hierarchy.

FIG. 25 Line 5 shows the name of an example collection specifier file such as shown in FIG. 2 Line 5 and FIG. 3. Only one interesting line from the example collection specifier file is shown on Line 6, to save presentation space. Line 6 provides a collection type indicator "ct-program" that specifies the collection type of the collection. The collection type "ct-program" indicates that the host collection contains source code files for an executable "C" program.

Lines 7–9 represent an index file of collection types known to the implementation. Using the collection type "ct-program" Line 6 as a key into the index table, Line 8 Column 2 provides the name of a corresponding collection type definition file "ct-program.def".

Lines 10–11 represent an excerpt of a collection type definition file for the "ct-program" collection type. Each collection type definition file must provide a list of known products for its collection type. Line 11 Column 2 provides the filename of an index file that lists known product types for the "ct-program" collection type.

Lines 12–13 represent an index file of known product types for the "ct-program" collection type. Line 13 contains a product type name "pt-program" that points to a product type definition file "pt-program.def".

Lines 14–15 represent a product type definition file for the "pt-program" product type. Line 15 provides the filename of an index file of known content types for the product type "pt-program".

Lines 16–17 represent an index file of known content types for the "pt-program" product type. Line 16 contains a content type name "content-c" that points to a content type definition file "content-c.def".

Lines 18–19 represent a content type definition file for the "content-c" content type. Line 19 provides the filename of an index file of known action types for the content type "content-c".

Lines 20–21 represent an index file of known action types for the "content-c" content type. Line 21 contains an action type name "action-c" that points to an action type definition file "action-c.def".

Lines 22–23 represent an action type definition file for the "action-c" action type.

The four levels shown above closely correspond to natural, practical boundaries found in collections. First, the collection type level models the types and characteristics of whole collections. Second, since collections may contain multiple products, a product type level is useful to model products. Third, since products are comprised of files containing various types of content, a content type level is useful to model content files. And fourth, since various types of content files require different processing actions, an action type level is useful to model various actions.

Example Type Definitions

FIG. 26 shows an example collection type index table and an example collection type definition file.

FIG. 27 shows an example product type index table and an example product type definition file.

FIG. 28 shows an example content type index table and an example content type definition file.

FIG. 29 shows an example action type index table and an example action type definition file.

Now that an overview of the fundamental four-level type hierarchy has been presented, the discussion proceeds to a detailed description of makefile generation operations.

Makefile Services and Fragments

Makefile services and makefile fragments are the fundamental building blocks of a collection makefile generator. Conceptual makefile services are implemented by physical makefile fragments.

The overall process of generating a makefile consists of obtaining collection instance information, substituting that information into various makefile fragments, and then assembling the substituted fragments into a completed makefile.

FIG. 30 shows an example makefile service index table that relates conceptual makefile services names in Column 1 with makefile fragment template names in Column 2. As can be seen in the figure, services can be conveniently grouped in accordance with the information that they represent. For example, Lines 2–9 index services pertaining to collections, and Lines 10–14 index services pertaining to collection products. Groupings are arbitrary, and can be chosen for human convenience.

In operation, makefile services that are specified in type definition files (eg. FIG. 26 Lines 9–15) are used as look up keys into a makefile service index table to obtain the names of associated makefile fragments. Collection instance information is substituted into the obtained makefile fragments, and the substituted fragments are then added to the output makefile.

Collection Services and Fragments

This section explains how an output makefile is constructed. It assumes that collection content classification information has already been obtained. Software modules Process Collection Services 131 and Do Collection Type Definition Services 132 are primarily responsible for the work that follows.

FIG. 21 shows a collection for which a makefile will be constructed. This is the starting point for makefile generation.

FIG. 22 shows a collection specifier file for the collection of FIG. 21. In particular, Line 3 of the collection specifier specifies a collection type of "ct-program" for the host collection.

FIG. 25 also conveys this information. Lines 5–6 show an excerpt from a collection specifier file that specifies a collection type of "ct-program". Lines 5–23 provide a summary of the information chaining that will be followed by the detailed explanations below. Interested readers may want to refer back to this figure periodically for a high level perspective on information chaining among type definition files.

Continuing, the collection type value "ct-program" from FIG. 22 Line 3 is used as a lookup key into the example collection type index table shown in FIG. 26. Line 2 column 2 provides the name of a corresponding collection type definition file.

FIG. 26 Lines 5–17 represent the type definition file for collection type "ct-program". Line 8 provides the name of an initial base template for the output makefile. An example base template file is shown in FIG. 38. This base template is small, and contains only a few lines of initial text. FIG. 26 Lines 9–15 specify a variety of makefile services associated with the abstraction level of whole collections. These makefile services, when processed, will add a variety of makefile code to the output makefile.

FIG. 26 Line 9 specifies the first makefile service to be generated. The service name "svc-coll-macro-platform" is looked up in the makefile service index table FIG. 30 Line 3 to obtain a fragment name "coll-macro-platform.tpl".

FIG. 31 shows a template file for the "coll-macro-platform.tpl" fragment. The main purpose of this fragment is to insert various top-level makefile macro definitions into the output makefile.

Now that a template has been identified, it can be processed and inserted into the output makefile. Do Collection Type Definition Services 132 calls Process Makefile Service 160 to oversee fragment substitution and insertion operations.

Process Makefile Service 160 calls Substitute Makefile Fragment 161 to substitute collection instance values into fragment placeholder strings. But since this first template has no placeholder strings for collection instance data, it requires no substitution operations. Therefore fragment substitution is explained later in this document.

Process Makefile Service 160 next calls Insert Makefile Fragment 162 to insert the completed "coll-macro-platform.tpl" fragment into the output makefile. FIG. 31 shows the fragment. FIG. 38 shows a base template that is copied to form the initial output makefile. FIG. 39 Lines 3–9 show the results of inserting the fragment into the output makefile.

Fragment Insertion

Fragment insertion generally proceeds by inserting fragment text into the makefile, above a specified location marker. The structure of a makefile fragment carries the necessary information.

FIG. 31 Lines 4 and 8 delimit one region of fragment text to be inserted. Lines 10 and 15 delimit another. Line 5 contains a fragment insertion command line. The first token "_marker_" specifies the insertion command name. The second token "marker-htree" specifies the name of a location marker string that must exist in the makefile. The third token "copy" is a control argument for the "_marker_" insertion command, and specifies that the delimited text should be copied into the makefile.

Thus to complete the previous example, Insert Makefile Fragment 162 would first locate the marker string "marker-htree" in the base template FIG. 38 Line 3, then copy FIG. 31 Lines 6–7 into the makefile, above the marker string. The results of this particular insertion are shown by FIG. 39 Lines 3–5.

Similarly, Insert Makefile Fragment 162 would copy FIG. 31 Lines 12–14 into the output makefile above the "marker-macros1" marker, thereby producing the results shown by FIG. 39 Lines 7–9.

Having thus described how insertion works, it can be seen that FIG. 39 shows the results of inserting all makefile services shown by FIG. 26 Lines 10–14 into the output makefile. The associated makefile fragment template files are shown in FIGS. 32–36. None of these fragments require substitution.

Other services specified in the host collection type definition would be inserted accordingly. The number and names of location markers are determined by implementation policy. The number of services, fragments, and the content of fragments are also determined by implementation policy.

FIG. 37 shows a table of typical fragment commands. Line 1 shows the start and end strings that delimit fragment content. Line 2 shows a marker command for inserting fragment text above a location marker in the output makefile. Line 3 shows a macro command for appending values to a macro definition within the makefile. Line 4 shows a target command for adding dependency values to a makefile target. Line 5 shows a target command for appending fragment text to the command region underneath a makefile target. This command will only copy a particular fragment text to a makefile target once, thereby preventing duplicate copies of makefile commands from being appended to a makefile target inadvertently. This is useful because in practice, multiple fragments may attempt to insert the same makefile commands under the same makefile target. Finally, Line 6 shows a target command for appending fragment text to a makefile target, but this command does allow multiple copies of a fragment text to be appended to the same target.

Product Services and Fragments

This section describes product services, product fragments, and fragment substitution operations.

FIG. 22 shows a collection specifier file for the collection of FIG. 21. In particular, Line 7 of the collection specifier specifies a product type of "pt-program" for the first product in the specifier file.

FIG. 25 shows the information chaining path between the collection type definition file Line 10 and the product type definition file "pt-program.def" Line 14.

FIG. 27 Lines 6–14 show example information for a "pt-program.def" product type definition file. In particular, Line 13 specifies a makefile service named "svc-prod-program" for this product type.

FIG. 30, the makefile service index table, provides in Column 2 the filenames of several makefile fragments Lines 11–13 that implement the single makefile service "svc-prod-program". This example illustrates the use of multiple physical fragments to implement one conceptual makefile service.

In particular, the three fragments represent platform independent Line 11, operating system dependent Line 12, and platform dependent Line 13 information. Separating the total service information into these categories provides two small conveniences. First, it enables technical sharing of platform independent and operating system information among multiple platforms, if site policy permits. Second, it provides human administrators with a few more abstraction levels for modelling makefile information, if so desired.

There is no requirement for splitting total service information into multiple fragment files. However, not splitting and not sharing information may require that multiple copies of some information be created. The particular amount of splitting and sharing used is determined by implementation policy.

Continuing, FIG. 40 shows the "prod-prog-pi.tpl" fragment template file. This fragment file contains placeholder strings that must be replaced with product instance values before the completed fragment is inserted into the output makefile. For example, Line 7 contains a replacement string "_prod_" that is replaced with the current product name FIG. 22 Line 6 "myprog" during the substitution process.

Substituting product instance values into fragment strings has the effect of generating product-specific makefile code in the output makefile. That way, the same fragment can be used to generate compatible makefile code for multiple products or files.

FIG. 43 shows a table of example substitution strings. Note that not all substitution strings are available to all fragments, since there is no need for them. For example, only collection-related strings are available for substituting fragments at the collection level. This is because there is no current product, and no current file being processed at the collection level. In contrast, all strings are available at the action substitution level, because current values for collection, product, and file are all known when action fragments are being processed.

FIG. 44 Lines 4–7 show the results of substitutions and insertions performed using the fragment of FIG. 40. The current product value used for substitutions is "myprog", from FIG. 22 Line 6.

Insertable Location Markers

Not all location markers must be in the initial base template file. FIG. 40 Line 17 shows an example of an insertable marker string. The main idea of insertable marker locations is that inserted fragments can themselves contain markers to support further insertions. That way fragment administrators can design their own marker locations and corresponding fragments. FIG. 44 Line 13 shows the inserted marker string from FIG. 40 Line 17.

Continuing with the example, FIG. 41 shows an operating system dependent fragment for appending build dependencies to makefile targets. FIG. 44 Line 22 shows how the fragment "_target_" command from FIG. 41 Line 6 adds a dependency relationship to the "build" target for the current product "myprog". The value of the replacement string "_mprod_" is defined in FIG. 43 Line 2. The macro "$(X)" in FIG. 41 Line 6 represents a file suffix value defined in FIG. 35 Line 9.

FIG. 42 shows a platform dependent fragment containing makefile commands for defining compiler flags Lines 7–8, defining a linker command Lines 15–16, defining a makefile target to link all object files into an executable program Lines 21–23, and adding dependencies to the product linking target Line 28.

FIG. 45 shows the results of substituting and inserting product fragments FIGS. 40–42 into the output makefile.

This concludes discussion of product level services and fragments.

Content Services and Fragments

This section describes content services and fragments. Content services and fragments are processed in the same way as collection and product fragments.

Continuing with the example, FIG. 21 shows a collection that contains a C program source file "cmdline.c" on Line 10. The content type of C source files is "ctype-c-source", as shown by the collection content classifier output shown in FIG. 23 Line 15.

FIG. 25 shows the information chaining path between the previous "pt-program.def" product type definition file Line 10 and the content type definition file "content-c.def" Line 18.

FIG. 28 Lines 6–13 show example content type definition information for the content type "ctype-c-source". In particular, Line 12 specifies a makefile service named "svc-file-c-source" for the current content file "cmdline.c".

FIG. 30, the makefile service index table, provides in Line 20 Column 2 the filename of a makefile fragment "file-c.tpl" that implements the makefile service "svc-file-c-source".

FIG. 46 shows the "file-c.tpl" fragment template file. This fragment contains two "_macro_" fragment commands for appending the name of the current C source file "cmdline.c" to two makefile macros in the output makefile. The first macro Line 6 contains the source filenames of all source files in the collection. However, the second macro contains only source filenames for the current product, by virtue of the "_Prod_" substitution placeholder string in the makefile macro name.

FIG. 48 Lines 3–5 show the results of substituting and inserting the "file-c.tpl" fragment template shown in FIG. 46.

Action Fragments

This section describes action services and fragments. Action services and fragments are processed in the same way as collection, product, and content fragments.

Continuing with the example, the current content type definition file FIG. 28 Line 10 specifies an action type of "action-c-source" for the current content file "cmdline.c".

FIG. 25 shows the information chaining path between the previous "content-c.def" content type definition file Line 18 and the action type definition file "action-c.def" Line 22.

FIG. 29 Lines 6–9 show an example action type definition for the action type "action-c-source". In particular, Line 9 specifies a makefile service named "svc-action-c-source" for the current content file "cmdline.c".

FIG. 30, the makefile service index table, provides in Line 27 Column 2 the filename of a makefile fragment "action-c-source.tpl" that implements the makefile service "svc-action-c-source".

FIG. 47 shows the "action-c-source.tpl" fragment template file. This fragment contains makefile commands for creating a makefile target to compile a C source file into an object file, and for adding dependencies such as include files to the newly created makefile target. The placeholder string "_deplist_" is defined in FIG. 43 Line 9. It holds dependency information for the current C source file.

FIG. 48 Lines 21–23 show the results of substituting and inserting the "action-c-source.tpl" fragment template shown in FIG. 47. The "_incl_dirs_" placeholder string has not been substituted in this example because include directory calculation is explained later in this document.

This concludes a general description of how makefiles are generated using collection instance information, type definition information, and makefile base templates, services, and fragments. The discussion now turns to special topics in makefile generation.

Standalone Makefile Services

In addition to specifying makefile services as part of a type definition, it is also possible to specify standalone makefile services in collection specifiers. Standalone makefile services can appear in both collection and product sections of collection specifiers.

Standalone makefile services are very practical and useful for adding additional functionality to a generated makefile, where the additional functionality is not directly associated with building the collection products. For example, standalone services can be used to clean up build directories after a build completes, or to insert makefile code for installing newly built products into site installation directories.

FIG. 49 shows an example collection specifier containing standalone makefile services. Line 4 specifies a makefile service for cleaning up all platform directories. Line 9 specifies a service for copying the file "myprog" to a new file "myprog.bak".

Although these two standalone service examples are simple, standalone services can be arbitrarily complex to satisfy the processing needs at hand. Standalone services are a very practical and convenient way of adding custom makefile code to a generated makefile.

In operation, standalone makefile services are processed in the same way as all other makefile services. Do Collection Standalone Services 133 and Do Product Standalone Services 143 retrieve standalone services from collection specifiers, and pass the retrieved information to Process Makefile Service 162 for normal substitution and insertion operations.

Product Replacement Names

This section discusses how multiple collection products can each use the same root filename in their output files without causing name collisions within the output makefile.

The main problem arises under the following conditions: multiple collection products are involved; products have different names in the collection specifier; and output product files should have the same base filename.

For example, consider the case where two products are defined within a collection "myprog" to produce an executable program file and a shared object executable file. The first product is named "myprog", and produces an executable file named "myprog". The second product is named "myprog-2" and produces a shared object file "myprog-2.so". But it is desirable to have the same base filename "myprog" on both output files, giving "myprog" and "myprog.so".

The second product cannot be named "myprog" to give an output filename of "myprog.so", because then a product name collision would result in the collection specifier; both products would have the same name.

One solution to the problem is to use a replacement name directive within the collection specifier to specify the base name of the product output file.

FIG. 50 shows examples of how product replacement names are used. Lines 1–11 show a collection specifier that defines two products, "myprog" and "myprog-2". Line 10 contains a product replacement name directive for the second product, specifying that product two should use the string "myprog" as the base filename for output files.

Lines 12–13 summarize how product and replacement names map on to substitution strings that will be used during substitution operations. The normal product name is stored in the "_prod_" substitution string, and the replacement product name is stored in the "_mprod_" (makefile product name) substitution string.

Lines 14–17 show an example fragment containing both substitution strings. The purpose of this fragment is to create an executable file by linking together object files. The control values in the LDFLAGS macro tell the linker whether to produce an executable file or a shared object file. Since LDFLAGS is unimportant for this example, specific linker flags are not shown.

Lines 15 and 17 use the "_mprod_" substitution string, because these lines work with the final product output file. Therefore they must use the product replacement name value. In contrast, Line 16 uses the "_prod_" substitution string, because Line 16 must avoid name collisions between different linker names and linker flag macro names.

Lines 18–21 show the substituted fragment for the first product that produces a normal executable program file.

Lines 22–25 show the substituted fragment for the second product that produces a shared object executable file.

Name collisions between final product output files are avoided because the filename suffixes for the two output products are different. The executable product uses a "$(X)" suffix substitution string, whereas the shared object product uses a "$(SO)" suffix substitution string.

As can be seen, the replacement name substitution string method achieves the desired goals. The base filenames of both output products are identical, yet name collisions among collection specifier product names, linker macro definitions, and output filenames are avoided.

Product Build Order

The main problem of product build order is caused by multiple products having dependencies among themselves. As a consequence, particular product build orders must sometimes be followed in order to ensure correct build results.

For example, consider a collection that contained a library product and a program product. Further suppose the program product used the library product, thereby creating a dependency relationship. It is clear that the library product must therefore be built first, so that the library exists when the program executable file is linked together.

One solution to the problem is to use product types as keys into a product build order table that provides a precedence ranking of product types.

FIG. 51 shows an example product build order table that provides a ranking among product types. Low numeric values are built first. Lines 6–7 show that library products are built before program products.

In operation, module Sort Product Build Orders 134 obtains the product types for all products that must be built, and obtains associated build order values from a product build order table such as FIG. 51. Product build order values are then sorted and returned to Collection Makefile Manager 130 for use in building products in the desired build order.

FIG. 52 shows how product build orders are reflected in the output makefile. Line 6 shows the main makefile build target and its dependencies, which include the library and executable program products. In the dependency list, the library product "mylib" appears to the left of the executable product "myprog", which means that "mylib" will be built before "myprog". Thus the required build order is achieved in the output makefile.

File Build Order

The main problem of file build order is caused by multiple files having external dependencies among themselves. External dependencies are not the same as include file dependencies that are created by internal contents of files. Instead, external dependencies are usually imposed on files by outside factors such as the computational environment. As a consequence, particular file build orders must sometimes be followed in order to ensure correct build results.

For example, some software development environments for personal computers require that graphical user interface resource files (.rc files) be processed before other files that reference the resource files. In this example, resource output files (.rc files) are similar to include files, in that they must exist before other files that use the output resource files can themselves be compiled.

As another example taken from a software development environment for personal computers, a precompiled header file in the C++ language must be compiled before other files that use it.

One solution to the problem is to use file or content types as keys into a file build order table that provides a precedence ranking of file types.

FIG. 53 shows an example file build order table that provides a ranking among file types. Low numeric values are built first. Lines 4–6 show that resource files are built first, precompiled C++ header files are built next, and normal C program source files are compiled last.

In operation, module Sort File Build Orders 144 obtains the file types for all files that must be built, and obtains associated build order values from a file build order table such as FIG. 51. File build order values are then sorted and returned to Product Makefile Manager 140 for use in building files in the desired build order.

FIG. 54 shows how file build orders are reflected in the output makefile. Line 10 shows the main build target for the program "myprog" and its dependencies, which include a resource file, a precompiled header file, and a normal C source file. In the dependency list Line 10, the resource file "myresource.rc" appears to the left of the precompiled header file "myprecompiled.o", which means that the resource file will be built before the precompiled header file. Thus the required build order is achieved in the output makefile.

Include Search Directories

The main problem of include file search directories is caused by the need to share include files that are external to the collection being processed.

Specifically, compilers can normally locate include files located in the same directory as source files that are being compiled, but compilers cannot normally locate include files in some arbitrary external directory within a computer filesystem. Instead, a list of external include file search directories must be provided to compilers for locating external include files.

It follows that makefile generators that generate compiler command lines must determine a list of relevant include file search directories and then add the list of include directories to compiler command lines.

One solution to the problem is to use product-dependent include file search directory lists. The main idea is that each product type definition can specify a set of directories containing include files for that product. A collection makefile generator can then search those directories to resolve include file dependencies obtained from parsing source code files.

FIG. 27 Line 10 shows how a product type definition specifies a list of include file search directories.

FIG. 55 shows an example include file search directory list for the gnulinux2 computing platform.

In operation, Calculate Include Search Directories 151 performs the work of identifying required include file search directories, and associates them with the substitution replacement string "_incl_dirs_".

FIG. 56 shows how the include file search directory mechanism works. Lines 2–3 show two example external include files that might be required for compilation of current source code files. The names of these external include file dependencies are normally provided by collection content classifier output, as shown in FIG. 23 Lines 19–20.

FIG. 56 Lines 5–6 show the resulting two include files that would be found by Calculate Include Search Directories 151. Note that the discovery order of the two include files is determined by the ordering of the search directories shown in FIG. 55. Directory search rule orderings are determined by the implementation, and are typically ordered to emphasize most specific information first, and most general information last. Thus the search rules shown in FIG. 55 emphasize local team information in preference to general site information.

FIG. 56 Line 7 shows how include search directories that contain desired include files are added to the internal substitution string value "_incl_dirs_".

FIG. 56 Line 12 shows the final result of substituting and inserting the fragment of FIG. 47 Lines 7–8 into an output makefile. The "_incl_dirs_" substitution string in the fragment template is replaced with actual include file search directories.

Thus the compiler command in the output makefile is provided with an optimal, correct list of include directories to search for include files.

Library Search Directories

The main problem of library file search directories is caused by the need to share library files that are external to the collection being processed.

Specifically, linkers can normally locate library files located in the same directory as object files that are being linked, but linkers cannot normally locate library files in some arbitrary external directory within a computer file system. Instead, a list of external library file search directories must be provided to linkers for locating external library files.

It follows that makefile generators that generate linker command lines must determine a list of relevant library file search directories and add the list of directories to linker command lines.

One solution to the problem is to use product-dependent library file search directory lists. The main idea is that each product type definition can specify a set of directories containing library files for that product. A collection makefile generator can then search those directories to resolve library file dependencies specified for the product.

FIG. 22 Line 9 shows how a product specification in a collection specifier can specify that particular libraries be linked into the final product. In this example, two libraries named "team-lib" and "gnulinux-lib" are specified.

FIG. 27 Line 9 shows how a product type definition specifies a list of library file search directories.

FIG. 57 shows an example library file search directory list for the gnulinux2 computing platform.

In operation, Calculate Library Search Directories 145 performs the work of identifying required library file search directories, and associating them with the substitution replacement string "_lib_dirs_".

FIG. 58 shows how the library file search directory mechanism works. Lines 2–3 show two example external library files that might be required for linking to a program executable file. The names of these external library file dependencies are normally provided by collection specifier directives, as shown in FIG. 22 Line 9.

FIG. 58 Lines 5–6 show the resulting two library files that would be found by Calculate Library Search Directories 145. Note that the discovery order of the two library files is determined by the ordering of the search directories shown in FIG. 57. The most platform dependent directories are searched first, and the least platform dependent directories are searched last.

FIG. 58 Line 7 shows how library search directories that contain desired library files are added to an internal substitution string value "_lib_dirs_".

FIG. 58 Line 8 shows how library names from the collection specifier are added to an internal substitution string value "_lib_names_".

FIG. 58 Lines 11–12 show the final result of substituting and inserting the fragment of FIG. 42 Lines 15–16 into an output makefile. The "lib_dirs_" substitution string in the fragment template is replaced with actual library file search directories. The "_lib_names_" substitution string in the fragment template is replaced with library names from the host collection specifier.

Thus the linker command in the output makefile is provided with an optimal, correct list of library directories to search for library files.

Virtual Platforms

As can be appreciated from the foregoing discussion, a large number of makefile fragments are required to effectively model the makefile needs of a typical industrial software environment. For example, several hundreds of fragments might be involved.

One helpful technique for managing large numbers of fragments is to organize them into virtual platform directories, and then use virtual platform search directories to find specific fragment files. A virtual platform is one that is invented by fragment administrators to represent a desired abstraction level for sharing makefile information.

There are two main benefits of this approach.

The first benefit is that information can be more easily shared at various operating system abstraction levels. For example, virtual platform "pi" information can be shared among all platforms, virtual platform "gnulinux" information can be shared among all GNUlinux systems, and virtual platform "gnulinux2" information can be used only by Gnulinux2 systems.

The second benefit is that virtual platform search rules make it possible to more easily override more generic information with more specific information. For example, placing "gnulinux2" ahead of "pi" in a set of virtual platform search rules ensures that the "gnulinux2" version of a same-named file will always be found before the "pi" version of the same-named file.

FIG. 59 shows a table of virtual platforms, with associated search directories.

FIG. 60 shows two examples of how virtual platform entries from the table of FIG. 59 can be converted into virtual platform search rules, or search directories.

For example, FIG. 59 Line 6 contains a virtual platform entry for the "gnulinux2" virtual platform. Column 1 holds the name of the virtual platform (the ".plt" suffix is a convention, but is not required). Columns 2–5 specify increasingly more general abstraction levels for possible sharing. The search rules shown in FIG. 60 Lines 7–10 correspond to the virtual platform names in FIG. 59 Columns 2–5.

In operation, a software module such as Process Makefile Service 160 might need to resolve a makefile service name into a fragment template file by performing a lookup through a makefile service index table such as shown in FIG. 30. The module would perform the lookup, and would obtain a filename for the desired fragment template.

Now the module must find the physical fragment file. This is where virtual platform search rules can be effectively used. Process Makefile Service 160 would use a virtual platform table such as the one shown in FIG. 59 to construct a set of virtual platform search directories such as shown in FIG. 60. Then, following the constructed search rules, the module would search for the desired fragment template file.

Platform Dependent Standalone Services

Virtual platforms can also be effectively used in collection specifiers to delineate platform dependent information such as makefile services or library names.

FIG. 61 shows an example collection specifier that contains virtual platform dependent directives.

Line 7 specifies a library name "mylib" that should be used for all platforms. However, Line 8 overrides the Line 7 directive for all "linux" virtual platforms. Line 8 specifies that for "linux" platforms an additional library is required for linking. Calculate Library Search Directories 145, when calculating for "gnulinux" platforms, would use Line 8 instead of Line 7 as the source for library names.

Lines 9–11 show the use of virtual platforms in standalone makefile service directives. In this example, module Do Product Standalone Services 143 would use Line 11 when processing "win98" platforms, Line 10 when processing "gnulinux" platforms, and Line 9 for when processing all other platforms.

Parallel Targets

The main problem addressed by parallel makefile targets is non-utilization of parallel processing resources, leading to lower than necessary execution performance of makefile operations.

Typical makefiles contain only "sequential" targets that are structured to support sequential computational operations using one computational execution resource. In contrast, parallel makefile targets can significantly improve computational performance by enabling the use of parallel computing resources that might be available.

Limits to Parallelism

Three main factors limit the amount of parallelism that can be used in a computation: (a) the inherent problem parallelism within the set of files that is being processed, (b) the physical parallelism available within the computational hardware and software environment, and (c) administrative limits on the amount of parallelism that can be used.

Problem parallelism is inherently determined by processing interdependencies among the files that must be processed. That is, only some files can be processed in parallel. The maximum number of files that can be processed in parallel determines the maximum problem parallelism.

Physical parallelism is determined by the physical limits of the computational environment. For example, operating systems usually limit the number of parallel processes that can be created, and computers always limit the number of physical CPU chips that are available for use.

Administrative parallelism is determined by administrative policy. This is because system administrators may want to limit the computational resources that can be accessed by any one parallel computation. For example, parallel calculations can generate significant amounts of computer load, so system administrators may want to protect other system users from big parallel calculations that hog scarce computational resources.

Useful parallelism is the maximum amount of parallelism that can usefully be applied to a particular computation under particular parallelism limits. Suppose that administrative parallelism limits are set high enough to be ignored. Then useful parallelism would be calculated as the minimum of problem parallelism and physical parallelism.

Parallel Target Examples

FIG. 62 shows examples of parallel targets and how they are used.

Line 3 shows a sequential makefile target that has 100 object file dependencies. As written, Line 3 will cause the 100 object files to be compiled in sequence.

Line 8 shows how parallelism can be obtained using the a make program, which is capable of spawning multiple parallel computational processes using sequential targets. GNU Make accepts a control argument "-j N" that specifies the number of parallel processes to spawn. In this example, 4 parallel processes are requested. Thus make would simultaneously build file-001.o through file-004.o.

Lines 12–16 shows an example set of parallel targets that might be generated by the present makefile generator invention. Line 12 is the top level target, with 4 dependencies that are the 4 parallel targets.

Lines 13–16 are parallel targets, each responsible for building 25 of the 100 example object files.

Lines 17–20 show how parallel targets can be executed using multiple machines with network filesystem access to the same makefile.

Lines 22–24 show how parallel targets can be executed using multiple shell windows on the same machine.

Lines 26–28 show how parallel targets can be executed using multiple background processes in one window on one machine.

Operation

In operation, module Calculate Collection Parallel Targets 135 calculates the number of parallel targets for the host collection.

The number of parallel targets to use is calculated by considering the parallelism limit information as described above. The problem parallelism limit corresponds to the number of dependencies on the build target. The physical parallelism limit is unknown (and is thus usually ignored) by the makefile generator, which is responsible only for generating the makefile and not for executing the makefile in particular hardware computing environments containing unknown parallel resources. The administrative parallelism limit is obtained from the collection type definition, because maximum administrative parallelism can be effectively represented as a characteristic property of a collection type. For example, a "ct-program-parallel" collection type could be defined.

The number of parallel targets required is calculated by dividing the total number of dependencies (the inherent problem parallelism) by the administrative parallelism limit obtained from a collection type definition such as FIG. 26 Line 16.

The names of parallel targets are constructed by using substitution strings in fragment templates. FIG. 63 shows a more detailed version of the file processing fragment of FIG. 47, but here extended with more fragments for constructing parallel targets. Line 7 uses the "_zpln_" (parallel number) substitution string to define a makefile macro for holding the names of all object files for all parallel targets for one collection product. Line 13 uses "_zpln_" to define a product-specific macro for holding the names of all object files for one parallel target. Line 19 uses "_zpln_" to define the names of parallel build targets.

FIG. 64 shows the final result of substituting and inserting the extended fragments of FIG. 63 into an output makefile.

Parallel Targets for Multiple Products

Parallel targets have been described for building a whole collection using a top level "build" target, under the control of module Calculate Collection Parallel Targets 135.

The mechanism for generate parallel targets for multiple products is identical but for several trivial changes. First, module Calculate Product Parallel Targets 146 is used at the product level instead of module Calculate Collection Parallel Targets 135 at the collection level. Second, product-specific target names based on the "_mprod_" substitution string are used instead of the collection-level "build" target name. For example, target names such as shown in FIG. 42 Line 21 are extended by adding a parallel number substitution string such as "_zpln_" to the target name. Third, new macro names for holding object files such as those shown in FIG. 45 Line 5 and Line 26 are extended by adding a parallel number substitution string such as "_zpln_" to the macro name.

FIG. 65 shows a simplified example output makefile capable of building multiple products sequentially or in parallel.

Further Advantages

As can be seen from the foregoing disclosure, fully automated makefile generators provide a scalable, fully-automated way of generating parallel target makefiles for processing collections. In addition, the four-level type hierarchy provides a flexible, extensible means for implementing local site makefile generation policies. Thus makefile generators provide a very useful service to humans and application programs that want to process collections automatically.

CONCLUSION

The present Collection Makefile Generator invention provides practical solutions to nine important makefile generation problems faced by builders of automated collection processing systems. The problems are: (1) the general collection makefile generator problem, (2) the multiple product build order problem, (3) the product file build order problem, (4) the include file directory problem, (5) the library file directory problem, (6) the multiple product naming problem, (7) the makefile parallel processing problem, (8) the template sharing problem, and (9) the makefile customization problem.

As can be seen from the foregoing disclosure, the present collection makefile generator invention provides automated collection processing systems with a competent, industrial-strength means for generating complex parallel makefiles in a convenient, automated, and scalable way that was not previously possible.

RAMIFICATIONS

Although the foregoing descriptions are specific, they should be considered as sample embodiments of the invention, and not as limitations. Those skilled in the art will understand that many other possible ramifications can be imagined without departing from the spirit and scope of the present invention.

General Software Ramifications

The foregoing disclosure has recited particular combinations of program architecture, data structures, and algorithms to describe preferred embodiments. However, those of ordinary skill in the software art can appreciate that many other equivalent software embodiments are possible within the teachings of the present invention.

As one example, data structures have been described here as coherent single data structures for convenience of presentation. But information could also be could be spread across a different set of coherent data structures, or could be split into a plurality of smaller data structures for implementation convenience, without loss of purpose or functionality.

As a second example, particular software architectures have been presented here to more strongly associate primary algorithmic functions with primary modules in the software architectures. However, because software is so flexible, many different associations of algorithmic functionality and module architecture are also possible, without loss of purpose or technical capability. At the under-modularized extreme, all algorithmic functionality could be contained in one software module. At the over-modularized extreme, each tiny algorithmic function could be contained in a separate software module.

As a third example, particular simplified algorithms have been presented here to generally describe the primary algorithmic functions and operations of the invention. However, those skilled in the software art know that other equivalent algorithms are also easily possible. For example, if independent data items are being processed, the algorithmic order of nested loops can be changed, the order of functionally treating items can be changed, and so on.

Those skilled in the software art can appreciate that architectural, algorithmic, and resource tradeoffs are ubiquitous in the software art, and are typically resolved by particular implementation choices made for particular reasons that are important for each implementation at the time of its construction. The architectures, algorithms, and data structures presented above comprise one such conceptual implementation, which was chosen to emphasize conceptual clarity.

From the above, it can be seen that there are many possible equivalent implementations of almost any software architecture or algorithm, regardless of most implementation differences that might exist. Thus when considering algorithmic and functional equivalence, the essential inputs, outputs, associations, and applications of information that truly characterize an algorithm should also be considered. These characteristics are much more fundamental to a software invention than are flexible architectures, simplified algorithms, or particular organizations of data structures.

Practical Applications

A collection makefile generator can be used in various practical applications.

One possible application is to improve the productivity of human computer programmers, providing them with an automated means of generating makefiles to replace their current manual methods.

Another possible application is in integrated development environments, which could use a collection makefile generator to generate makefiles for collections being worked on by the integrated development system.

Type Information Hierarchy

A four-level collection type definition information hierarchy was presented here, but other organizations of type information are also possible. One example is a linear type definition organization, such as shown in FIG. 10. Another example is a three-level hierarchy that has no action types, or no content types. Another example is a five-level hierarchy that supports sub-products of products.

Type definition hierarchies are stored externally outside collection subtrees in preferred implementations, but other implementations are also possible. One example is storing type information internally, within the main collection subtree. Another example is storing type definition information within a collection specifier file. Another example is storing type definition information in a relational database format, either inside or outside the collection boundaries.

Makefile Fragments

The preferred embodiment described above represented makefile fragments as simple text files. However, other methods of representing fragments are also possible. One example is to use the SGML (Standard Generalized Markup Language) language, which has greater expressive power and stronger syntax conventions than text files. Another example is to use the XML language, which is simpler than SGML, but which still has greater expressive power and stronger syntax conventions than text files. Another example is to use a relational database to store fragments, which would allow the use of standard query languages to manipulate fragments.

The preferred embodiment described above assembled an output makefile by adding fragments to a simple "linked list of lines" data structure in computer memory. However, other methods of assembling an output makefile are also possible. One example is to store makefile lines in database records. Another example is to perform fragment additions using an external disk file to store the output makefile. Another example is to use an external program to perform fragment additions. Another example is to use an external makefile assembly server that maintains an internal, persistent copy of the output makefile during construction, and which passes back the constructed makefile on demand.

Virtual Platforms

The preferred embodiment described above uses a four-level virtual platform hierarchy to organize makefile fragment information into specific, generic, family, and platform independent operating system categories. However, other organizational schemes are also possible. One example is to use a linear structure that aggregates related information into fewer fragments, but that still permits sharing. Another example is to use a hierarchical structure organized by company, department, team, and individual.

Standalone Makefile Services

The preferred embodiment described above uses standalone makefile services comprised of single lines within collection specifiers. However, other methods are also possible. One example is to use multi-line standalone services. Another example is to use named standalone makefile services that are stored outside collection specifiers.

Simplifications

The preferred embodiment described above contains several advanced features that help to improve human productivity in various ways. However, advanced features are not always required, and simpler embodiments are possible. One example is to omit parallel makefile targets. Another example is to omit multiple product support within collections. Another example is to omit virtual platform sharing support. Another example is to use a simpler type definition hierarchy more suited to simpler processing situations that contain less process variance within the processing environment.

As can be seen by one of ordinary skill in the art, many other ramifications are also possible within the teachings of this disclosure. Collection makefile generators use collection information and makefile fragment information to generate precisely customized, high-performance makefiles for processing collections, in an automated, scalable way that was not previously available.

SCOPE

The full scope of the present invention should be determined by the accompanying claims and their legal equivalents, rather than from the examples given in the specification.

I claim:

1. A collection makefile generator process, to be performed on or with the aid of a computer that is configured with collection makefile generator software means for generating makefiles for collections, comprising the following steps:
    (a) receiving a request to generate a makefile for a collection,
    (b) accessing collection information for said collection,
    (c) classifying said collection information with a collection content classifier means, and
    (d) generating a makefile for said collection with a collection makefile generator means,
    wherein collections are data structures comprised of a collection specifier and collection content containing zero or more collection content files, and wherein a collection specifier contains information about a collection instance, and wherein collection membership information describes collection content,
    thereby providing a solution to the collection makefile generator problem, and
    thereby enabling human programmers to generate collection makefiles in a fully-automated, scalable way that was not previously available.

2. The process of claim 1, wherein
    (a) said step of generating a makefile uses makefile service and makefile fragment template information,
    thereby providing a solution to the makefile customization problem, and
    thereby enabling human programmers to extensively customize the makefile generation process by controlling the information content of fragments used to implement makefile services, in an automated, scalable way that was not previously available.

3. The process of claim 1, wherein
    (a) said step of generating a makefile uses substitution strings representing collection instance values to replace placeholder strings in makefile fragments,
    thereby providing a solution to the multiple product naming problem, and
    thereby helping to solve the makefile customization problem, and
    thereby enabling human programmers to use practical placeholder strings to represent useful collection instance information values in makefile fragments in a more convenient way than was previously available.

4. The process of claim 1, wherein
    (a) said step of generating a makefile uses standalone makefile service information,
    thereby helping to solve the makefile customization problem, and
    thereby enabling human programmers to further additively customize generated makefiles by specifying ad hoc additions to the generated makefile in the form of standalone makefile service statements within collection specifiers.

5. The process of claim 1, wherein
    (a) said step of generating a makefile uses virtual platform information,
    thereby providing a solution to the makefile template sharing problem, and
    thereby enabling human programmers to minimize makefile fragment creation and maintenance costs by sharing makefile fragments across collection, product, file, action, and platform types when it is advantageous to do so.

6. The process of claim 1, wherein
    (a) said step of generating a makefile uses information selected from the group consisting of include file search directory information and library file search directory information,
    thereby providing solutions to the include file directory problem and the library file directory problem, and
    thereby helping to improve the runtime performance of compilers and linkers by providing them with optimal lists of include file and library search directories to search during compilation and linking operations.

7. The process of claim 1, wherein
    (a) said step of generating a makefile uses product build order information,
    thereby providing a solution to the multiple product build order problem, and
    thereby enabling human programmers to specify the construction of multiple output products from a single collection, even where said multiple products must be processed in a particular build order in order to ensure correct results.

8. The process of claim 1, wherein
    (a) said step of generating a makefile uses file build order information,
    thereby providing a solution to the product file build order problem, and
    thereby enabling human programmers to specify a proper build order for multiple product file types within a single collection product, even where the multiple product files must be processed in a particular build order in order to ensure correct results.

9. The process of claim 1, wherein
    (a) said step of generating a makefile uses parallelism limit information to calculate and generate parallel makefile targets,
    thereby providing a solution to the makefile parallel processing problem, and
    thereby increasing the productivity of human programmers by generating makefiles that can be executed in parallel to reduce the time required to perform makefile operations.

10. A programmable collection makefile generator device, whose actions are directed by collection makefile generator software means for generating makefiles for collections, executing a process comprising the following steps:
    (a) receiving a request to generate a makefile for a collection,
    (b) accessing collection information for said collection,
    (c) classifying said collection information with a collection content classifier means, and
    (d) generating a makefile for said collection with a collection makefile generator means,
    wherein collections are data structures comprised of a collection specifier and collection content containing zero or more collection content files, and wherein a collection specifier contains information about a collection instance, and wherein collection membership information describes collection content,
    thereby providing a solution to the collection makefile generator problem, and
    thereby enabling human programmers to generate collection makefiles in a fully-automated, scalable way that was not previously available.

11. The programmable device of claim 10, wherein
    (a) said step of generating a makefile uses makefile service and makefile fragment template information, thereby providing a solution to the makefile customization problem, and thereby enabling human programmers to extensively customize the makefile generation process by controlling the information content of fragments used to implement makefile services, in an automated, scalable way that was not previously available.

12. The programmable device of claim 10, wherein
(a) said step of generating a makefile uses substitution strings representing collection instance values to replace placeholder strings in makefile fragments,
thereby providing a solution to the multiple product naming problem, and
thereby helping to solve the makefile customization problem, and
thereby enabling human programmers to use practical placeholder strings to represent useful collection instance information values in makefile fragments in a more convenient way than was previously available.

13. The programmable device of claim 10, wherein
(a) said step of generating a makefile uses standalone makefile service information,
thereby helping to solve the makefile customization problem, and
thereby enabling human programmers to further additively customize generated makefiles by specifying ad hoc additions to the generated makefile in the form of standalone makefile service statements within collection specifiers.

14. The programmable device of claim 10, wherein
(a) said step of generating a make file uses virtual platform information,
thereby providing a solution to the makefile template sharing problem, and
thereby enabling human programmers to minimize makefile fragment creation and maintenance costs by sharing makefile fragments across collection, product, file, action, and platform types when it is advantageous to do so.

15. The programmable device of claim 10, wherein
(a) said step of generating a makefile uses information selected from the group consisting of include file search directory information and library file search directory information,
thereby providing solutions to the include file directory problem and the library file directory problem, and
thereby helping to improve the runtime performance of compilers and linkers by providing them with optimal lists of include file and library search directories to search during compilation and linking operations.

16. The programmable device of claim 10, wherein
(a) said step of generating a makefile uses product build order information,
thereby providing a solution to the multiple product build order problem, and
thereby enabling human programmers to specify the construction of multiple output products from a single collection, even where said multiple products must be processed in a particular build order in order to ensure correct results.

17. The programmable device of claim 10, wherein
(a) said step of generating a makefile uses file build order information,
thereby providing a solution to the product file build order problem, and
thereby enabling human programmers to specify a proper build order for multiple product file types within a single collection product, even where the multiple product files must be processed in a particular build order in order to ensure correct results.

18. The programmable device of claim 10, wherein
(a) said step of generating a makefile uses parallelism limit information to calculate and generate parallel makefile targets,
thereby providing a solution to the makefile parallel processing problem, and
thereby increasing the productivity of human programmers by generating makefiles that can be executed in parallel to reduce the time required to perform makefile operations.

19. A computer readable memory, encoded with data representing a collection makefile generator program that can be used to direct a computer when used by the computer, comprising:
(a) means for receiving a request to generate a makefile for a collection,
(b) means for accessing collection information for said collection,
(c) means for classifying said collection information with a collection content classifier means, and
(d) means for generating a makefile for said collection with a collection makefile generator means,
wherein collections are data structures comprised of a collection specifier and collection content containing zero or more collection content files, and wherein a collection specifier contains information about a collection instance, and wherein collection membership information describes collection content,
thereby providing a solution to the collection makefile generator problem, and
thereby enabling human programmers to generate collection makefiles in a fully-automated, scalable way that was not previously available.

20. The computer readable memory of claim 19, wherein
(a) said means for generating a makefile uses makefile service and makefile fragment template information,
thereby providing a solution to the makefile customization problem, and
thereby enabling human programmers to extensively customize the makefile generation process by controlling the information content of fragments used to implement makefile services, in an automated, scalable way that was not previously available.

21. The computer readable memory of claim 19, wherein
(a) said means for generating a makefile uses substitution strings representing collection instance values to replace placeholder strings in makefile fragments,
thereby providing a solution to the multiple product naming problem, and
thereby helping to solve the makefile customization problem, and
thereby enabling human programmers to use practical placeholder strings to represent useful collection instance information values in makefile fragments in a more convenient way than was previously available.

22. The computer readable memory of claim 19, wherein
(a) said means for generating a makefile uses standalone makefile service information,
thereby helping to solve the makefile customization problem, and
thereby enabling human programmers to further additively customize generated makefiles by specifying ad hoc additions to the generated makefile in the form of standalone makefile service statements within collection specifiers.

23. The computer readable memory of claim 19, wherein (a) said means for generating a makefile uses virtual platform information, thereby providing a solution to the makefile template sharing problem, and thereby enabling human programmers to minimize makefile fragment creation and maintenance costs by sharing makefile fragments across collection, product, file, action, and platform types when it is advantageous to do so.

24. The computer readable memory of claim 19, wherein (a) said means for generating a makefile uses information selected from the group consisting of include file search directory information and library file search directory information, thereby providing solutions to the include file directory problem and the library file directory problem, and thereby helping to improve the runtime performance of compilers and linkers by providing them with optimal lists of include file and library search directories to search during compilation and linking operations.

25. The computer readable memory of claim 19, wherein (a) said means for generating a makefile uses product build order information, thereby providing a solution to the,multiple product build order problem, and thereby enabling human programmers to specify the construction of multiple output products from a single collection, even where said multiple products must be processed in a particular build order in order to ensure correct results.

26. The computer readable memory of claim 19, wherein (a) said means for generating a makefile uses file build order information, thereby providing a solution to the product file build order problem, and thereby enabling human programmers to specify a proper build order for multiple product file types within a single collection product, even where the multiple product files must be processed in a particular build order in order to ensure correct results.

27. The computer readable memory of claim 19, wherein (a) said means for generating a makefile uses parallelism limit information to calculate and generate parallel makefile targets, thereby providing a solution to the makefile parallel processing problem, and thereby increasing the productivity of human programmers by generating makefiles that can be executed in parallel to reduce the time required to perform makefile operations.

* * * * *